United States Patent
Harmon et al.

(10) Patent No.: US 12,102,031 B2
(45) Date of Patent: Oct. 1, 2024

(54) METER HOUSING APPARATUS AND METER FLOW DETECTION METHOD

(71) Applicant: DEERE & COMPANY, Moline, IL (US)

(72) Inventors: Andrew W. Harmon, Davenport, IA (US); Mandar M. Kale, Pune (IN); Terrill W. Murray, Milan, IL (US)

(73) Assignee: DEERE & COMPANY, Moline, IL (US)

( * ) Notice: Subject to any disclaimer, the term of this patent is extended or adjusted under 35 U.S.C. 154(b) by 711 days.

(21) Appl. No.: 16/914,901

(22) Filed: Jun. 29, 2020

(65) Prior Publication Data

US 2021/0127566 A1  May 6, 2021

Related U.S. Application Data

(60) Provisional application No. 62/928,532, filed on Oct. 31, 2019.

(51) Int. Cl.
*A01C 7/10* (2006.01)
*A01C 15/00* (2006.01)

(52) U.S. Cl.
CPC .......... *A01C 7/105* (2013.01); *A01C 7/10* (2013.01); *A01C 7/102* (2013.01); *A01C 15/007* (2013.01)

(58) Field of Classification Search
CPC .......... A01C 7/10; A01C 7/082; A01C 15/05; A01C 15/007; A01C 15/124; A01C 7/102; A01C 7/105; B65G 2201/0202; B65G 2201/047; B65G 53/66; B65G 53/56; B65G 43/08
See application file for complete search history.

(56) References Cited

U.S. PATENT DOCUMENTS 4,079,362 A * 3/1978 Grimm .................. A01C 7/105
                                                340/684
4,616,577 A * 10/1986 van der Lely ........... A01C 7/10
                                                340/684
(Continued)

FOREIGN PATENT DOCUMENTS

CA      2379078 A1     9/2003
CA      2245200 C  *   6/2008 ........... A01B 79/005
(Continued)

OTHER PUBLICATIONS

Kverneland Brochure; "The Inventors of Pneumatic Seeding Technology"; 2017; 28 pages.
(Continued)

*Primary Examiner* — Alicia Torres
(74) *Attorney, Agent, or Firm* — Taft Stettinius & Hollister LLP; Stephen F. Rost

(57) ABSTRACT

A method for identifying commodity flow through a meter on an agricultural machine. The method includes providing a meter housing coupled to a tank and a first sensor in communication with a controller, coupling the first sensor to a location proximate to the meter housing, identifying, with the controller through the first sensor, when a buildup of commodity is positioned adjacent to the first sensor, and initiating a first response, with the controller, when the buildup of commodity is identified adjacent to the first sensor.

17 Claims, 14 Drawing Sheets

(56) References Cited

U.S. PATENT DOCUMENTS

| | | | | |
|---|---|---|---|---|
| 5,927,217 | A * | 7/1999 | Halford | A01C 7/081 |
| | | | | 111/174 |
| 9,963,305 | B2 * | 5/2018 | Gervais | A01C 7/081 |
| 10,329,101 | B2 * | 6/2019 | Gervais | A01C 7/081 |
| 10,337,645 | B2 * | 7/2019 | Roberge | F16K 1/2007 |
| 10,538,397 | B2 * | 1/2020 | Gervais | A01C 7/081 |
| 11,234,360 | B2 * | 2/2022 | Erker | B01F 27/1921 |
| 11,240,954 | B2 * | 2/2022 | Pidwerbesky | B01F 35/2112 |
| 11,266,064 | B2 * | 3/2022 | Schilling | B01F 27/70 |
| 2006/0278726 | A1 * | 12/2006 | Holly | A01C 7/20 |
| | | | | 239/69 |
| 2014/0049395 | A1 | 2/2014 | Hui et al. | |
| 2015/0223390 | A1 * | 8/2015 | Wendte | A01C 7/10 |
| | | | | 111/177 |
| 2019/0297773 | A1 * | 10/2019 | do Amaral Assy | A01C 7/124 |

FOREIGN PATENT DOCUMENTS

| | | | | |
|---|---|---|---|---|
| DE | 102016117945 A1 * | 3/2018 | | |
| EP | 0476266 A1 * | 7/1991 | | |
| EP | 2708104 A2 | 3/2014 | | |
| WO | WO-2017011355 A1 * | 1/2017 | ........... | A01C 15/006 |

OTHER PUBLICATIONS

Amity Technology; "Owners Operating Manual 3800/5250 Air Cart"; Oct. 31, 2017, 55 pages.

Extended European Search Report and Written Opinion issued in European Patent Application No. 20202218.2, dated Mar. 23, 2021, in 8 pages.

* cited by examiner

| Inlet Sensor Status | Outlet Sensor Status | Motor Condition | Tank Status | Condition | Response |
|---|---|---|---|---|---|
| Pulsing | Pulsing | Engaged | Empty | Calibrated properly | Continue |
| Solid on | Pulsing | Engaged | Empty | Miscalibrated | Adjust |
| Pulsing | Solid on | Engaged | Empty | Miscalibrated | Adjust |
| Solid on | Solid on | Engaged | Empty | Miscalibrated | Adjust |
| Off | Off | Engaged | Empty | Miscalibrated | Adjust |

Fig. 5b

| Inlet Sensor Status | Outlet Sensor Status | Motor Condition | Tank Status | Condition | Response |
|---|---|---|---|---|---|
| Solid on | Pulsing | Engaged | Not Empty | Normal | Green roller |
| Solid on | Off | Engaged | Not Empty | Error: Roller failure | Red roller |
| Solid on | Solid on | Engaged | Not Empty | Error: Below meter blockage | Red roller |
| Pulsing | Pulsing | Engaged | Not Empty | Error: Above meter bridge | Alter agitation mode |
| Intermittent | Off | Off | Not Empty | Roller blow-by | Orange roller |
| Off | Intermittent | Off | Not Empty | Roller blow-by | Orange roller |
| Pulsing | Pulsing | Engaged | Empty | Empty tank | Tank warning |

Fig. 5c

METER HOUSING APPARATUS AND METER FLOW DETECTION METHOD

CROSS-REFERENCE TO RELATED APPLICATION

The present application claims the benefit of U.S. Provisional Application No. 62/928,532 filed Oct. 31, 2019, the contents of which are hereby incorporated herein in entirety.

FIELD OF THE DISCLOSURE

The present disclosure relates generally to identifying the flow of commodity through a meter assembly and more specifically to identifying commodity flow performance.

BACKGROUND

Modern air seeders utilize airflow through conduit to direct commodity such as fertilizer and seed to a desired location. Typically, the commodity is stored in a tank on a cart and selectively provided to conduits to be further transported to a drill assembly or otherwise ultimately placed in the underlying soil. A meter assembly is often positioned between the tank and the conduit to selectively distribute commodity from the tank into the conduit.

SUMMARY

One embodiment is a method for identifying commodity flow through a meter on an agricultural machine. The method includes providing a meter housing coupled to a tank and a first sensor in communication with a controller, coupling the first sensor to a location proximate to the meter housing, identifying, with the controller through the first sensor, when a buildup of commodity is positioned adjacent to the first sensor, and initiating a first response, with the controller, when the buildup of commodity is identified adjacent to the first sensor.

One example of this embodiment includes positioning a second sensor along a second location of the meter housing to identify when commodity is provided past the second location. One aspect of this example includes initiating a second response with the controller when the second sensor does not identify the presence of commodity. Part of this aspect includes providing a third sensor that identifies the presence of commodity in the tank, wherein the second response includes identifying the presence of commodity in the tank with the controller through the third sensor. In another part of this aspect the second response includes initiating an agitation step, with the controller, to agitate any commodity in the tank. Yet another part of this aspect includes providing a third sensor that identifies the presence of commodity in the tank, wherein the second response includes determining the presence of commodity in the tank with the controller through the third sensor and initiating an agitation step, with the controller, when the third sensor identifies the presence of commodity.

In another example of this embodiment, the first response includes providing an alert that the buildup of commodity was identified.

Yet another example includes providing a roller in the meter housing that processes commodity there through, the meter housing having an exhausted side along the roller and the meter housing having a processing side along the roller, wherein the first sensor is positioned along the exhausted side of the meter housing. One aspect of this example includes providing a second sensor and positioning the second sensor at the processing side of the meter housing to identify when commodity is passing through the processing side of the roller. Part of this example includes initiating a second response with the controller when the second sensor does not identify the presence of commodity, the second response including any one or more of initiating an agitation step with the controller to agitate any commodity in the tank, determining the presence of commodity in the tank with the controller through a third sensor, and providing an alert that commodity is not passing through the meter housing.

Another example of this embodiment includes monitoring, with the controller, one or more of a motor speed and a motor torque of a meter roller motor and identifying with the controller, when the meter roller motor is not rotating. One aspect of this examples includes executing a calibration procedure for the first sensor, with the controller, when the meter roller motor is not rotating to establish a no-commodity reading. Part of this aspect includes providing a run selector which selectively diverts flow between two or more passages and is positioned to selectively pass proximate to the first sensor, and selectively moving the run selector, with the controller, to pass the first sensor as part of the calibration procedure.

Yet another example includes providing a user-input providing selection of commodity types, communicating a selected commodity type of the selection of commodity types to the controller, and executing a calibration operation for the first sensor, with the controller, based on the selected commodity type.

Yet another embodiment is a method for identifying a blockage of commodity in a meter assembly. This method includes providing a tank, a meter housing having a roller rotationally coupled therein to selectively distribute a commodity from an inlet of the meter housing to an outlet of the meter housing, a first sensor, and a controller. Coupling the first sensor to the meter housing at a location that provides a commodity blockage reading to the controller when commodity is at least partially blocked from exiting the outlet and identifying the blockage reading with the controller and providing a blockage response.

One example of this embodiment includes providing a second sensor, a tank, a third sensor, and an agitator, coupling the second sensor to the meter housing at a location that identifies the presence of commodity at the inlet, determining, with the controller through the second sensor, when commodity is not present at the inlet, determining, with the controller through the third sensor, when commodity is in the tank, and altering parameters of the agitator with the controller when the second sensor does not identify commodity and the third sensor identifies there is commodity in the tank.

In another example of this embodiment the first sensor is coupled to the meter housing adjacent to the roller to identify when cavities of the roller pass thereby and selectively executing a calibration process for the first sensor, the calibration process including maintaining a rotation speed of the roller with the controller, increasing the sensitivity of the first sensor with the controller when the first sensor is not communicating a signal to the controller, and decreasing the sensitivity of the first sensor with the controller when the first sensor is communicating a constant signal to the controller.

Yet another example includes providing a run selector that is movable within a cavity and positioning the first sensor adjacent to the cavity and selectively executing a calibration process for the first sensor, the calibration process include placing the roller in a no-rotation state with the controller, moving the run selector from a first position to a second position with the controller to thereby wipe debris from the run selector cavity, and setting a no commodity reading value for the first sensor with the controller.

Yet another embodiment is a method for identifying the blockage location of a meter assembly. This method includes providing a meter housing having an inlet and an outlet, an inlet sensor, an outlet sensor, and a controller. Positioning the inlet sensor at a location of the meter housing that identifies when commodity is provided through the inlet. Positioning the outlet sensor at a location of the meter housing that identifies when commodity is not exiting the outlet. Monitoring the inlet sensor and outlet sensor with the controller to identify when commodity is not flowing through the meter assembly.

One example of this embodiment includes identifying, with the inlet sensor communicating with the controller, when commodity is not entering the inlet and providing an indication thereof and identifying, with the outlet sensor communicating with the controller, when commodity is not substantially exiting the outlet and providing an indication thereof.

Another embodiment is a commodity metering assembly. The assembly has a meter housing defining an inlet and at least one outlet, a roller rotationally coupled to the meter housing to selectively process a commodity from the inlet to the at least one outlet, and a first sensor coupled to the meter housing. Wherein, the first sensor is positioned to identify a buildup at the at least one outlet.

One example of this embodiment has a flapper configured to pivot about a flapper axis and having a first position and a second position, wherein the flapper is sized so at least a portion of the flapper passes a location proximate to the first sensor as the flapper transitions from the first position to the second position. In one aspect of this example, the meter housing defines an arc-shaped surface that is substantially coaxial with the flapper axis and the first sensor is positioned to have a primary reading direction at least partially through the arc-shaped surface.

In another example, the first sensor has a primary reading direction at least partially directed toward the outlet. One aspect of this example has wear plates positioned between the meter housing and the roller, wherein the first sensor is positioned so the primary reading direction is unobstructed by the wear plates.

In yet another example the meter housing defines a commodity flow path and the first sensor is separated from the commodity flow path by a meter material. In yet another example the meter housing has a first wall and a second wall along the outlet and the roller ejects commodity from the roller towards the first wall along a commodity flow path, wherein the first sensor is coupled to the second wall. Another example has a flapper configured to pivot about a flapper axis, wherein the meter housing defines a flapper sweep cavity that allows the flapper to pivot between a first position and a second position and the first sensor is coupled to the meter housing at a location adjacent to the flapper sweep cavity. Yet another example has a second sensor coupled to the meter housing at the inlet configured to identify the presence of commodity at the inlet.

Another embodiment is a meter assembly that has a meter housing defining an inlet and an outlet and configured to selectively transfer a commodity through the meter housing, a flapper configured to pivot between a first position and a second position within a sweep cavity, and a first sensor coupled to the meter housing and having a primary reading direction at least partially oriented into the sweep cavity. Wherein, as the flapper pivots from the first position to the second position at least a portion of the flapper passes through the primary reading direction.

In one example of this embodiment, the flapper is sized to remove buildup from the sweep cavity as the flapper transitions between the first position and the second position. In another example, the first sensor is positioned at least partially in a cavity of the meter housing.

In yet another example of this embodiment, material of the meter housing separates the first sensor from the sweep cavity. In one aspect of this example, the primary reading direction is through an arc-shaped surface of the meter housing defined along the sweep cavity. In part of this aspect, the flapper has a flapper length that is about the same as a radius length of the arc-shaped surface.

In another example of this embodiment the meter housing defines a commodity flow path between the inlet and the outlet and the first sensor is positioned along the outlet outside of the flow path.

Yet another embodiment is a method for identifying a blockage of commodity in a meter assembly. The method includes providing a meter housing, a flapper, and a first sensor coupled to the meter housing, positioning the first sensor to have a primary reading direction oriented towards the flapper, cycling the flapper between a first position and a second position to clear buildup along the primary reading direction of the first sensor, and monitoring the first sensor to identify a blockage.

One example of this embodiment includes providing a roller that selectively rotates within the meter housing and restricting roller rotation when the flapper is cycling. Yet another example includes providing a second sensor coupled to the meter housing at an inlet and executing a calibration procedure after the flapper is cycled wherein the second sensor is calibrated to identify commodity. In one aspect of this example, the second sensor is calibrated to show commodity is present when commodity is in a corresponding tank of the meter assembly and the second sensor is calibrated to show commodity is missing when there is not commodity in the corresponding tank.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5*b* is a chart identifying a calibration condition;

FIG. 5*c* is a chart identifying commodity flow conditions;

Corresponding reference numerals are used to indicate corresponding parts throughout the several views.

DETAILED DESCRIPTION

Figure 1:
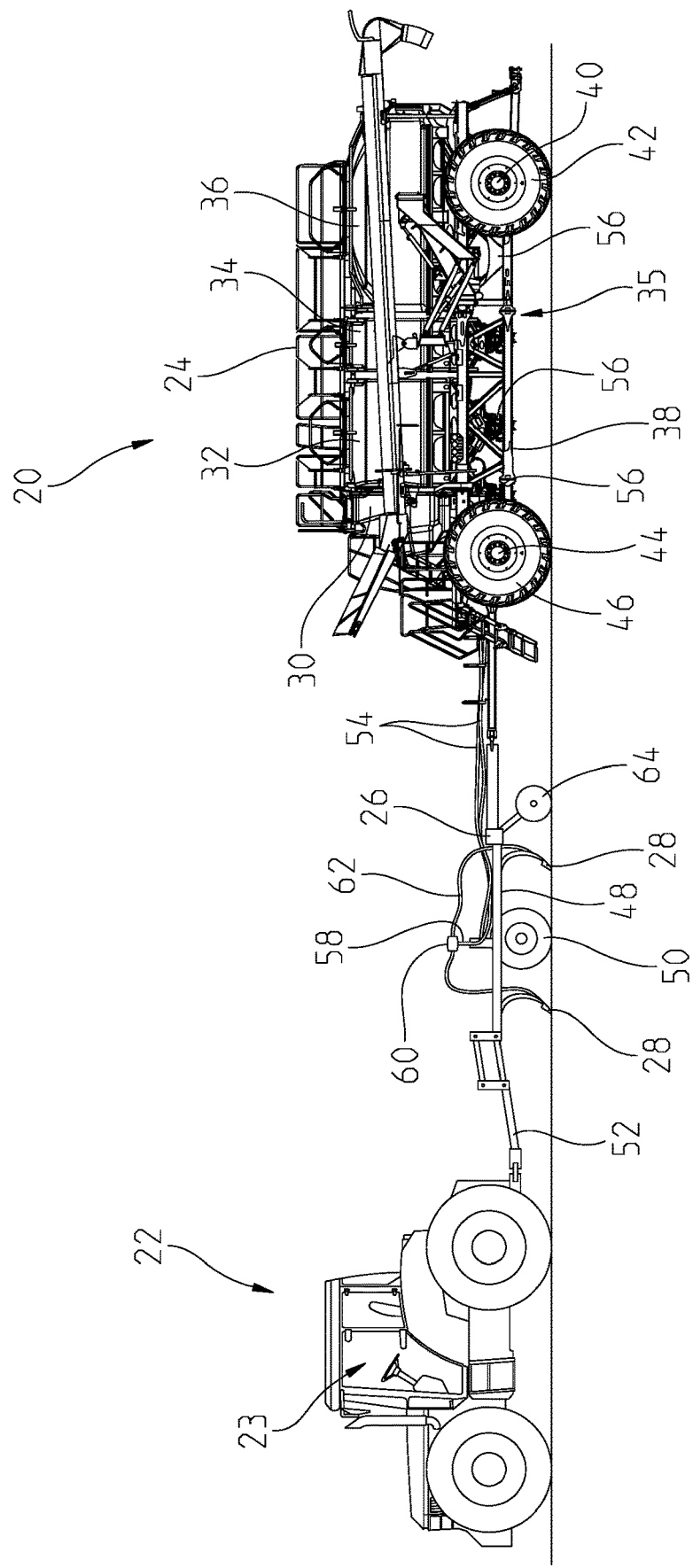
FIG. 1 is a side view of a towed cart and prime mover along with an attached implement.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

An air or pneumatic seeder 20 is shown in FIG. 1 towed by a tractor or prime mover 22. The seeder 20 includes an air cart 24, also known as a commodity cart, having one or more tanks for one or more commodities to be applied to the soil, and a drill or implement 26 which applies the commodity to the soil. The drill has a plurality of ground engaging tools 28. The cart 24 is shown with four tanks 30, 32, 34, and 36 mounted on a frame 38. The frame 38 is supported on a rear axle 40 having wheels/tires 42 at the rear of the frame 38. Depending on the cart configuration, additional axles may be provided, such as front axle 44 and wheels/tires 46. The axles and wheels support the cart frame 38 for movement over the ground surface towed by tractor 22. Any number of tanks can be provided on the air cart. The term "cart" should be broadly construed to include any device towed by a prime mover that is supported on one or more axles, such as a trailer, wagon, cart, implement, etc.

The drill 26 includes a frame 48 supported by ground wheels 50 and is connected to the rear of the tractor 22 by a tongue 52. As shown, the cart 24 is known as a "tow behind" cart meaning that the cart follows the drill. In alternative arrangements, the cart may be a "tow between" cart meaning that the cart is between the tractor 22 and drill 26. In yet a further possible arrangement, the air cart and drill can be combined onto a common frame. The tanks 30, 32, 34, and 36 can be any suitable device for holding a material or commodity such as seed or fertilizer to be distributed to the soil. The tanks could be hoppers, bins, boxes, containers, etc. The term "tank" shall be broadly construed herein. Furthermore, one tank with multiple compartments can also be provided.

A pneumatic distribution system 35 includes a fan located behind the front tires 46, connected to a product delivery conduit structure having multiple product flow passages 54. The fan directs air through the passages 54. A product meter assembly 56 is located at the bottom of each tank and delivers product from the tanks at a controlled rate to the passages 54 and the air stream moving through the passages 54.

Each passage 54 carries product in the air stream to a secondary distribution tower 58 on the drill 26. Typically, there will be one tower 58 for each passage 54. Each tower 58 includes a secondary distributing manifold 60 located at the top of a vertical tube. The distributing manifold 60 divides the flow of product into a number of secondary distribution lines 62. Each secondary distribution line 62 delivers product to one of a plurality of ground engaging tools 28 which opens a furrow in the soil and deposits the product therein. The number of passages 54 may vary from one to eight or ten or more, depending on the configuration of the cart and drill. Depending on the cart and drill, there may be two distribution manifolds in the air stream between the meters and the ground engaging tools. Alternatively, in some configurations, the product is metered directly from the tank into secondary distribution lines 62 leading to the ground engaging tools 28 without an intermediate distribution manifold.

A firming or closing wheel 64 associated with each tool 28 trails the tool and firms the soil over the product deposited in the soil. Various types of tools 28 may be used including, tines, shanks, disks, etc. The tools 28 are movable between a lowered position engaging the ground and a raised position above the ground. Each tool may be configured to be raised by a separate actuator. Alternatively, multiple tools 28 may be mounted to a common rockshaft for movement together. In yet another alternative, the tools 28 may be fixed to the frame 38 and the frame 38 raised and lowered by linkages on each of the drill wheels 50.

Figure 2:
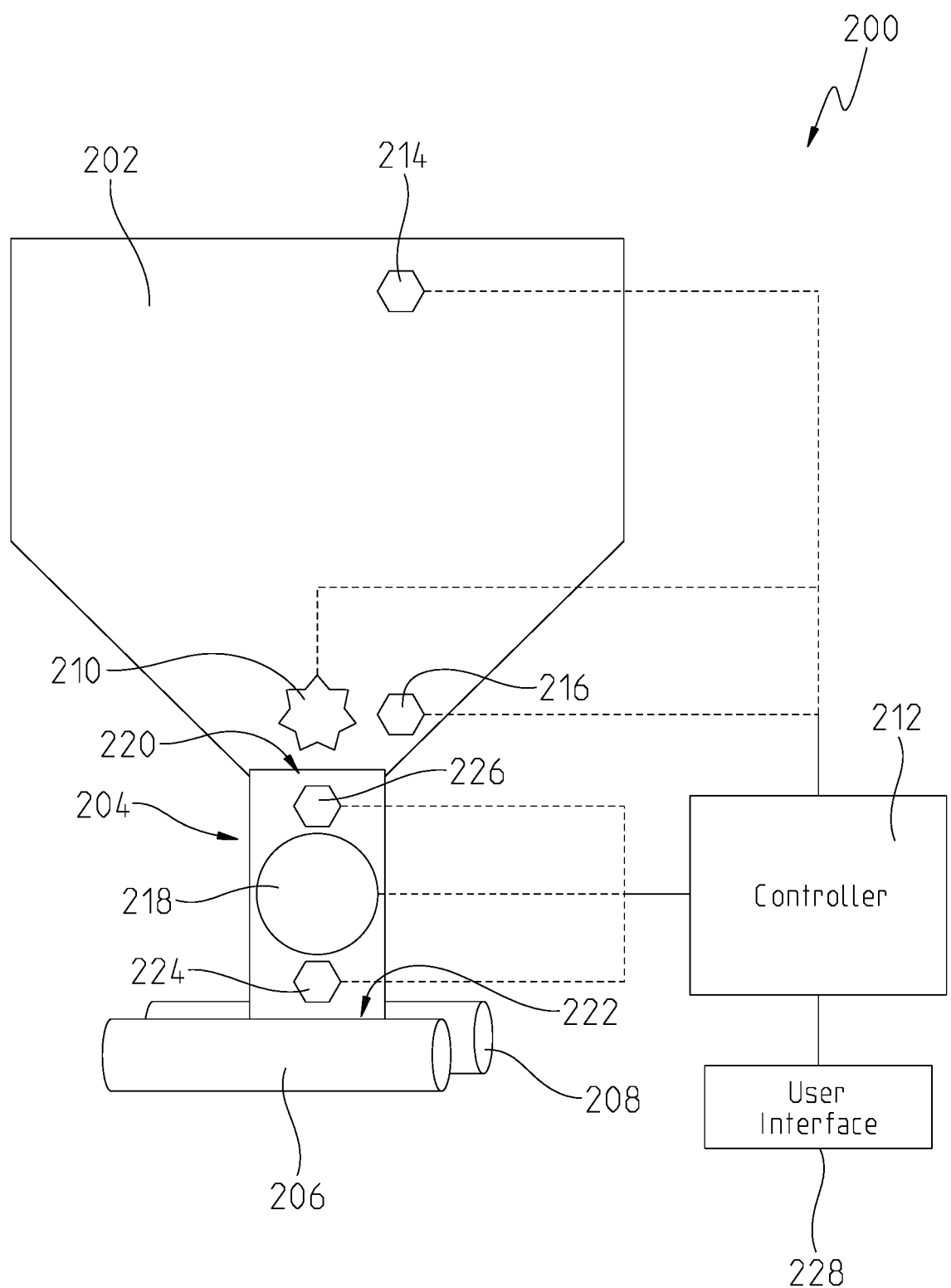
FIG. 2 is a schematic view of a meter assembly.

Referring now to the non-exclusive embodiment of FIG. 2, a schematic view of a meter assembly 200 is illustrated. The meter assembly 200 may have a reservoir or tank 202 coupled to a meter 204. The tank 202 may be any of the tanks 30, 32, 34, and 36 and be sized to contain commodity therein and direct the commodity to the meter 204. Commodity may refer to seed, fertilizer, or other nutrients and the like that promote growing a crop. The meter 204 may be representative of the product meter assembly 56. Further, the meter 204 may selectively distribute commodity from the tank 202 to a first or second passage 206, 208. In one aspect of this disclosure, the meter 204 may have a run selector, flapper, or the like that is selectively repositionable to distribute commodity from the tank 202 into either one of the first passage 206 or the second passage 208 depending on the position of the flapper.

While two passages 206, 208 are illustrated herein, this disclosure contemplates embodiments with more than two passages coupled to the meter 204. Further still, there may be only one passage coupled to the meter 204. As will be understood in view of this disclosure, the teachings discussed herein are applicable to meters having any number of passages coupled thereto.

In one aspect of this disclosure, the tank 202 may have an agitator 210 positioned in or on the tank 202. The agitator 210 may be a rotary agitator having extensions that extend radially away from a rotation axis. The agitator 210 may interact with the tank 202 to agitate any commodity therein to ensure the commodity is properly fed into the meter 204. While a rotary agitator is discussed herein, this disclosure contemplates any known commodity agitator for the agitator 210. In one aspect of this disclosure, the agitator 210 may be selectively engaged by a controller 212 to agitate any commodity in the tank 202.

The amount or presence of commodity in the tank 202 may be identified through one or more sensor as well. In one non-exclusive example, a tank fill height sensor 214 may be positioned to identify the fill height of any commodity in the tank 202. The sensor 214 may be an ultrasonic sensor, a camera, or any other sensor that can identify the presence of commodity in the tank 202.

In another non-exclusive example, the tank 202 may have a tank load sensor 216 positioned to identify the weight of the tank 202 along with any commodity positioned therein. The sensor 216 may be a load sensor or the like positioned between the tank 202 and the cart frame 38 or portion thereof to identify the weight of the tank 202 and commodity therein. In this configuration, the sensor 216 may communicate readings to the controller 212 that are indicative of the weight of commodity in the tank 202. In one aspect of this disclosure, the weight of the tank 202 may be a value stored in a memory unit of the controller 212 or elsewhere. The weight of the tank 202 may be compared to the readings from the sensor 216 to identify when the tank is empty. For example, when the sensor 216 identifies a reading to the controller 212 that is about equal to the weight of the tank 202, the controller 212 may identify that the tank 202 is substantially empty and does not contain a significant amount of commodity.

In one aspect of this disclosure, the meter 204 may have a roller 218 positioned therein. The roller 218 may selectively distribute commodity from an inlet 220 to an outlet 222. The roller 218 may rotate about an axis and have a plurality of cavities 604 (see FIG. 6) spaced circumferentially there about. Each of the plurality of cavities 604 may have a radially distal opening that allows commodity to enter and exit each of the plurality of cavities 604 as the roller 218 rotates. Accordingly, commodity positioned at the inlet 220 may fall by gravity into one of the cavities 604 of the roller 218 as it rotates thereby. Next, as that roller cavity 604 rotates about the axis towards the outlet 222, the commodity may fall out of the cavity 604 as gravity and radial forces move the commodity towards the outlet 222. Accordingly, the commodity may be distributed in a metered fashion from the inlet 220 to the outlet 222 based on the rotation speed of the roller 218.

In one aspect of this disclosure, the rotational speed of the roller 218 may be dictated by the controller 212. More specifically, the roller 218 may be coupled to a motor or the like. In one non-limiting example the motor is an electrical motor that is controlled by the controller 212 to rotate the roller 218. However, the motor may be a pneumatic or hydraulic motor as well that is controlled through the controller 212 via a corresponding electro-hydraulic or electro-pneumatic system. Accordingly, this disclosure contemplates implementing the teachings discussed herein to control a roller 218 with the controller 212 utilizing an electrical, electro-hydraulic, or electro-pneumatic system.

In another aspect of this disclosure, the outlet 222 may have an outlet sensor 224 positioned to identify a blockage of commodity in the outlet 222. More specifically, the outlet sensor 224 may be positioned between the roller 218 and the passages 206, 208. The sensor 224 may communicate with the controller 212 to identify when a blockage of commodity is present in the outlet 222. In one aspect of this disclosure, the readings of the sensor 224 may be used to identify the source of a commodity blockage in the seeder 20. More specifically, the sensor 224 may identify when commodity is not passing through the meter 204 to allow the controller 212 to respond as discussed herein.

In one embodiment of this disclosure, an inlet sensor 226 may be positioned along the inlet 220 of the meter 218. The sensor 226 may communicate with the controller 212 to identify when commodity is not present at the inlet 220. More specifically, when the tank 202 is properly filled with commodity, and that commodity is properly flowing through the inlet 220, the sensor 226 may communicate to the controller 212 that commodity is present. However, when the tank 202 is empty or when the commodity jams above the inlet 220, the sensor 226 may communicate to the controller that there is not commodity present at the inlet 220 and therefore the meter 204 is not distributing commodity into the passages 206, 208.

The controller 212 may also communicate with a user interface 228. The user interface 228 may provide a location for a user to input data or commands to the controller 212 as well as allow the controller 212 to provide an indicator to the user. In one non-exclusive example of this disclosure, the user interface 228 may be a touch screen device. The touch screen device may have a plurality of user-selectable inputs displayed thereon that allow the user to communicate an input preference to the controller 212. In another embodiment, the user interface 228 may be buttons and switches among other things positioned on a dash and selectable by a user. In yet another embodiment, the user interface 228 may rely on visual or auditory input from the user to indicate user preference.

Similarly, the user interface 228 may provide an indicator to the user regarding actions and observations of the controller 212. More specifically, the user interface 228 may be a display that shows icons representing the conditions of the seeder 20 identified by the controller 212 via communication with the sensors 214, 216, 224, 226, agitator 210, and roller 218. In one non-limiting example, the user interface 228 may show an icon when the roller 218 is being powered. Further, the user interface 228 may show an icon when the agitator 210 is engaged. Further still, the controller 212 may show an icon when blockage is identified by the outlet sensor 224 or when no commodity is identified by the inlet sensor 226 among other things. The indication presented by the user interface 228 may also be a light that is illuminated, an auditory signal played to the user, haptic feedback that is felt by the user, or any other type of indication that may be observable by a user. Further, in one non-exclusive example the user interface 228 is a remote device such as a tablet, computer, or smartphone.

Figure 3:
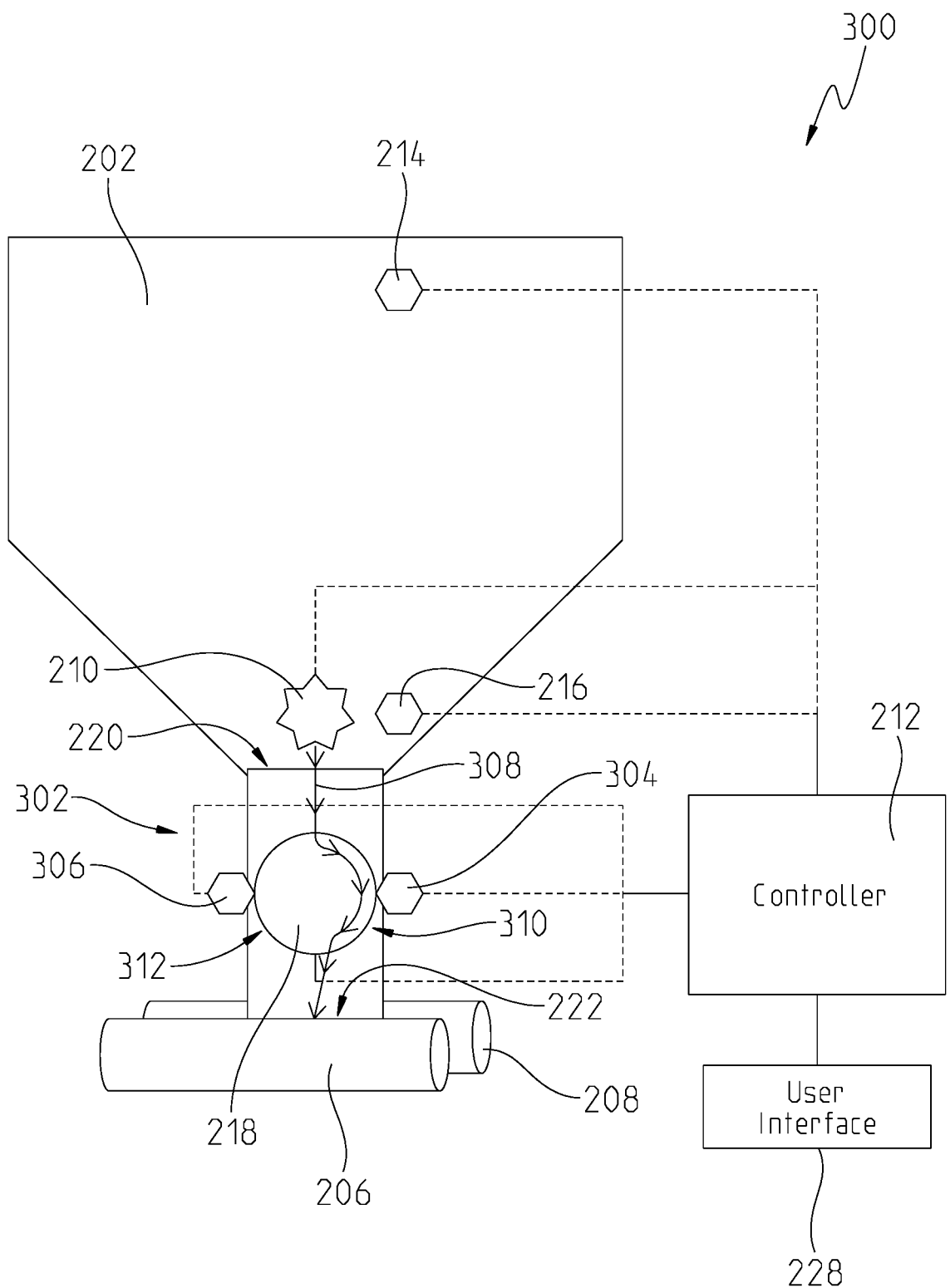
FIG. 3 is a schematic view of another embodiment of a meter assembly.

Referring now to FIG. 3, another embodiment of a meter assembly 300 is illustrated. The meter assembly 300 of FIG. 3 may be similar to the meter assembly 200 of FIG. 2 with like components identified with like reference numbers. More specifically, the meter assembly 300 may have a tank 202 with sensors 214, 216 and an agitator 210 that communicate with a controller 212. However, a meter 302 of FIG. 3 may position an inlet sensor 304 and an outlet sensor 306 about the roller 218 rather than at the inlet 220 and outlet 222 as illustrated in FIG. 2. More specifically, the meter 302 may be designed to process commodity with the roller 218 along a commodity path 308. The commodity path may be the typical path of the commodity as the roller 218 rotates to transfer commodity from the tank 202 to the passages 206, 208. More specifically, the flow path 308 may transfer commodity through a processing side 310 of the meter 302 wherein the cavities of the roller 218 are expected to have commodity therein as the roller 218 rotates. Further, the meter 302 may also have an exhausted side 312 wherein the cavities of the roller 218 will typically be void of commodity under proper operating conditions.

As discussed herein, the roller 218 may have a plurality of cavities 604 defined there around to transfer commodity from the inlet 220 to the outlet 222. In this configuration, the cavities 604 on the side of the roller 218 moving from the inlet 220 to the outlet 222 may be at least partially filled with commodity. As the cavities 604 of the roller 218 pass the outlet 222, any commodity therein is typically dispersed out of the outlet 222. As the roller 218 continues to rotate past the outlet 222, the cavities 604 moving from the outlet 222 back to the inlet 220 are typically substantially void of commodity. In this configuration, the sensors 304, 306 may communicate with the controller 212 to identify when commodity is properly being transferred through the meter 302, when commodity is not entering the meter 302, and when commodity is blocked at the outlet 222 among other things.

In one aspect of the embodiment of FIG. 3, the controller 212 may monitor the sensors 304, 306 along with the roller 218 to ensure that commodity if moving as expected through the meter 302. More specifically, if the controller 212 identifies the roller 218 should be moving, the controller 212 may check the inlet sensor 304 to identify whether commodity is present in the cavities 604 of the roller 218. If the inlet sensor 304 identifies to the controller 212 that commodity is not present, the controller 212 may send an indication that commodity is not present and execute additional functions to determine cause. The additional functions may include one or more of check sensors 214, 216 to determine whether commodity is in the tank 202, engage the agitator 210, and check the roller 218 condition among other things.

If commodity is identified by the inlet sensor 304, the controller 212 may check the outlet sensor 306 to ensure the commodity is properly leaving the outlet 222 and entering one or more of the passages 206, 208. More specifically, if commodity is properly entering at least one of the passages 206, 208, the outlet sensor 306 may indicate to the controller 212 that the cavities 604 of the roller 218 are substantially void of commodity. However, if there is a blockage at the outlet 222 or the like, commodity may remain in the cavities 604 of the roller 218 as it rotates and the outlet sensor 306 may indicate the same to the controller 212. If a blockage is identified by the controller 212 through the outlet sensor 306, the controller 212 may send an indication of the condition to the user via the user interface 228 or the like.

While controller 212 is used throughout, the teachings of this disclosure may be implemented by any one or more controller of the seeder 20 or tractor 22. More specifically, the controller 212 can be any controller or combination of controllers capable of communicating with one or more of the sensors 214, 216, 224, 226, 304, 306, agitator 210, and roller 218. Further, the controller 212 may contain or otherwise have access to a processor for executing commands and a memory unit for storing algorithms, charts, measured values, sensor readings, threshold values, or any other data or the like. Further still, in one example of this embodiment the controller 212 is at least partially located remotely from the seeder 20 and data is communicated wirelessly thereto. Accordingly, while a single controller 212 is illustrated, this disclosure contemplates using any known control device or combination of control devices to implement the logic and teachings discussed herein.

In another aspect of this disclosure, the controller 212 may communicate with the sensors 214, 216, 224, 226, 304, 306, agitator 210, and roller 218 through any known form of communication or combination thereof. More specifically, in one embodiment the controller 212 may communicate through wires of a wire harness or the like that electrically couple the sensors 214, 216, 224, 226, 304, 306, agitator 210, and roller 218 to the controller 212. As one non-exclusive example, communication with the controller 212 may be executed through a Controller Area Network or "CAN bus." Alternatively, the controller 212 may communicate with the sensors 214, 216, 224, 226, 304, 306, agitator 210, and roller 218 wirelessly via any known wireless protocol. In this embodiment, the controller 212 may send and receive information from the corresponding components without being physically electrically coupled thereto via wires or the like. Regardless the form with which the controller 212 sends and receives information, the controller 212 may communicate with one or more of the sensors 214, 216, 224, 226, 304, 306 to identify present conditions and instruct responses from one or more of the agitator 210, roller 218, and user interface 228 among other things.

The sensors 224, 226, 304, 306 may be any type of sensor able to identify commodity in the corresponding meter 204, 302. In one non-exclusive example, the sensors 224, 226, 304, 306 may be proximity sensor that can identify the presence of commodity through a portion of the corresponding meter 204, 302. However, this disclosure contemplates utilizing any type of sensor capable of identifying such a condition.

Figure 4A:
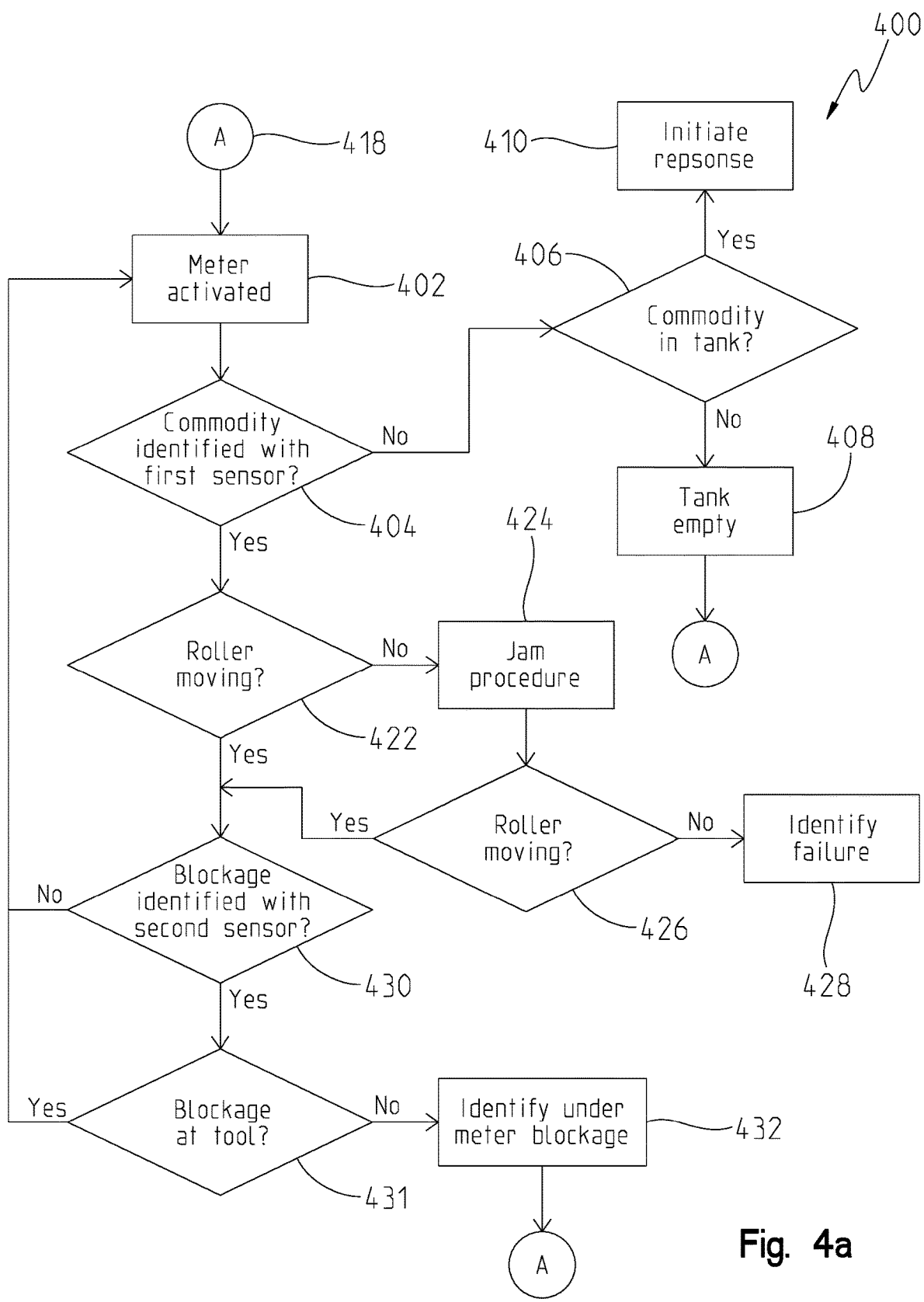
FIG. 4*a* is a logic flowchart for one embodiment of this disclosure.

Referring now to FIG. 4a, one non-exclusive example of a meter flow logic 400 is illustrated. The meter flow logic 400 may be implemented by controller 212 utilizing the configurations discussed herein or by any other controller or combination of controllers of the tractor 22, seeder 20, or other device. Initially in box 402, the controller 212 may consider whether the meter 204 or 302 is activated. In one non-exclusive example, the controller 212 may consider signals sent to the roller 218 to determine whether the meter is activated in box 402. In other examples, the controller 212 may consider whether a motor powering the roller 218 is powered as part of box 402. In other words, box 402 may generally consider whether the roller 218 of the corresponding meter should be rotating and thereby processing commodity there through.

If the meter is not activated in box 402, the logic may end and continue to monitor the meter to identify when it is activated. However, if the meter is identified as activated in box 402, the controller 212 may then monitor a first sensor in box 404 to identify whether commodity is going into the meter. In one non-exclusive example, the first sensor may be the inlet sensor 226. In another example, the inlet sensor may be inlet sensor 304. Further still, the first sensor of box 404 may be any sensor that is capable of identifying the presence of commodity in the meter.

If commodity is not identified in box 404, the controller 212 may consider whether there is commodity in the corresponding tank in box 406. For example, the tank may be tank 202 and the controller 212 may utilize one or more of the tank fill height sensor 214 or the tank load sensor 216 to determine whether there is commodity in the tank 202 in box 406. If the tank fill height sensor 214 indicates the tank 202 is empty, the controller may execute box 408. Further, the controller 212 may identify the tank 202 as empty when the tank load sensor 216 identifies the weight of the tank 202 to correspond to an empty tank. Further, the controller 212 may implement any other sensor or the like to check for the presence of commodity in the tank 202 in box 406.

If the tank 202 is determined empty in box 406, the controller implements box 408. In other words, box 408 is implemented when the first sensor of box 404 does not identify commodity in the meter and tank sensors 214, 216 don't identify commodity in the tank 202. In box 408, the controller 212 may determine that the first sensor of box 404 did not identify commodity because there was not any commodity present in the tank 202. In one aspect of box 408, the controller 212 may utilize the user interface 228 or the like to identify the empty condition.

Alternatively, if commodity is identified in the tank in box 406, the controller 212 may conclude that a jam of commodity is restricting flow into the meter and initiate a response in box 410. Box 410 may be initiated when the first sensor of box 404 is not identifying commodity in the meter but commodity is identified in the tank in box 406. In other words, box 410 is initiated when commodity is in the tank 202 but otherwise prevented from entering the meter.

The response of box 410 may be providing an indication that the controller 212 identified a jam. In one non-exclusive example, the indication of a jam from box 410 may be implemented with the user interface 228. For example, the indication may be an icon on a display showing the jam. Further, the indication may be an auditory signal or haptic feedback.

Figure 4B:
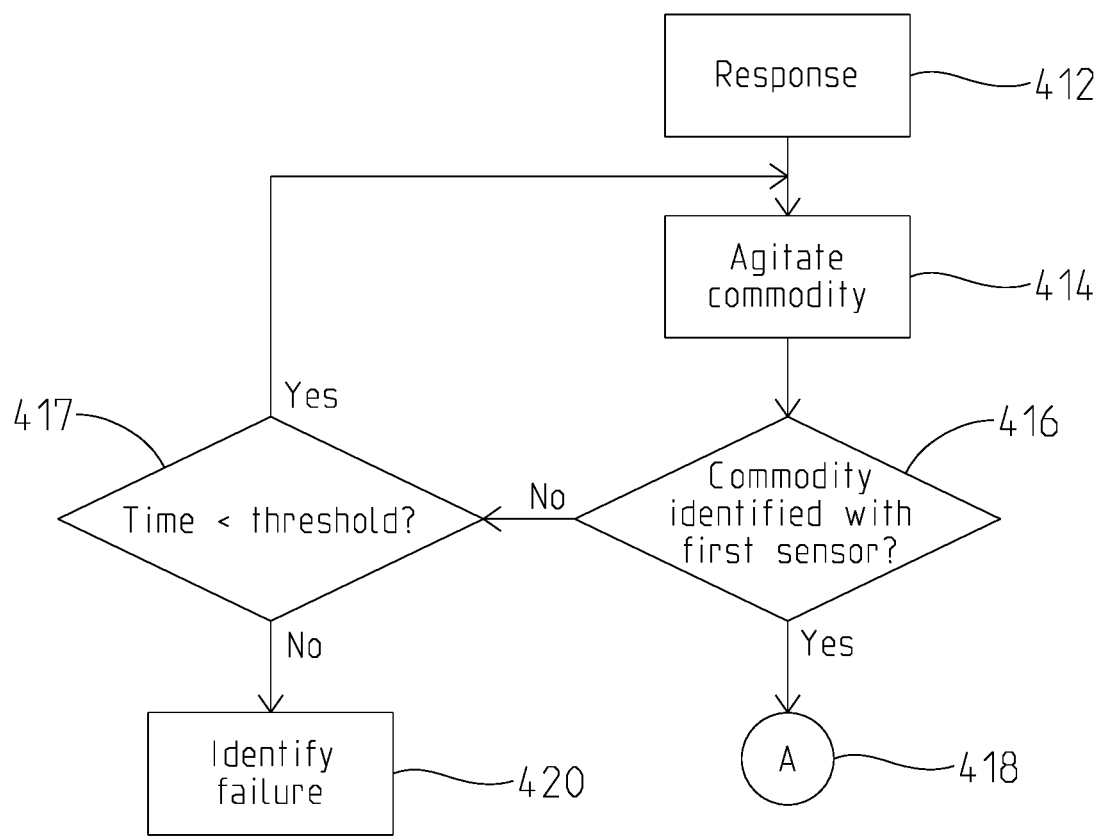
FIG. 4*b* is a logic flowchart for a response for the flowchart of FIG. 4*a;*

In addition to, or instead of, showing an indication, the controller 212 may initiate a response sequence starting with box 412 (see FIG. 4b) after, or instead of, box 410. The response sequence may include agitating the commodity in the tank 202 in box 414. More specifically, the controller 212 may engage the agitator 210 in box 414 to break loose the blocked commodity. In the embodiment where the agitator 210 is a rotating member, box 414 may include altering the rotation speed or pattern of the agitator 210. Alternatively, the controller 212 may alter the agitator 210 in any way that may break the blockage of commodity to flow into the meter.

After or during the agitation step of box 414, the controller 212 may monitor the first sensor to identify when commodity is provided to the meter in box 416. More specifically, if the blockage of commodity is broken in box 414, commodity will enter the meter and the first sensor will identify the presence of commodity in the meter in box 416. If commodity is identified in box 416, the controller 212 may identify that the blockage is addressed and re-run the logic 400 from the start 418.

However, if commodity is not identified by the first sensor in box 416, the controller 212 may identify that the blockage is still present and continue to agitate the commodity in box 414 for a preset amount of time in box 417. Box 417 may be a preset time threshold wherein the controller 212 continues to agitate the commodity in the tank 202 in an attempt to break loose the blockage. However, if the blockage is not broken loose after the preset time threshold, the controller 212 may identify that the agitation step of box 414 is not affecting the blockage. After the time threshold is met, the controller 212 may execute box 420 and identify the failure to break loose the blockage of commodity.

The controller 212 may identify the failure of box 420 utilizing the user interface 228 or any of the methods discussed herein for indicating a condition is present. More specifically, the controller 212 may display that the commodity remains blocked from the meter in box 420. Further, auditory, visual, or haptic signals may be utilized in box 420 to identify the failure.

Referring back to box 404, the controller 212 may execute box 422 if commodity is identified by the first sensor in box 404. In box 422, the controller 212 may identify whether the roller 218 is moving. More specifically, the controller 422 may identify signals sent to a motor or the like intended to power the roller 218 to identify whether the roller 218 should be moving. In one non-exclusive example, the controller 212 may monitor the power provided to an electric motor that powers the roller 218. If the power provided thereto is above a threshold, the controller 212 may determine that the roller 218 is not moving and execute a jam procedure of box 424.

The jam procedure of box 424 may include reversing the rotation direction of the roller 218 temporarily to clear any jams between the roller 218 and the meter housing. After the roller 218 is temporarily reversed in box 424, the controller 212 may engage the roller 218 to rotate in the normal operating direction. Then, in box 426, the controller 212 may again check whether the roller 218 is moving as described for box 422. If the roller 218 is still not moving in box 426. The controller 212 may identify the failure in box 428. More specifically, in box 428 the controller 212 may utilize the user interface 228 or any of the indication methods discussed herein to identify that the roller 218 is not rotating as expected.

If the roller 218 was identified as moving properly in either box 422 or box 426, the controller 212 may executed box 430 and monitor a second sensor of the meter. The second sensor of box 430 may be the outlet sensor 224 or the outlet sensor 306. Further still, the second sensor of box 430 may be any sensor capable of identifying a blockage of commodity at the outlet of a meter. In one aspect of this disclosure, commodity is intended to flow from the roller 218 and into one or more of the corresponding passages 206, 208. Under normal operating conditions, the commodity briefly passes by the second sensor as it enters one of the passages 206, 208. However, when a blockage of commodity occurs at or in the outlet of the meter, the commodity will remain stationary at the second sensor. In one aspect of this disclosure, the second sensor of box 430 is able to communicate to the controller 212 when the commodity is not properly flowing into one or more of the passages 206, 208.

If a blockage is not identified by the second sensor in box 430, the meter assembly is functioning as expected and the controller 212 may return to box 402 to repeatedly execute the logic 400. However, if a blockage is identified in box 430, the controller 212 may implement box 431 and check other vehicle systems for a blockage at the tool 28. More specifically, one or more sensor may be positioned along the distribution tower 58 or along any portion of the tool that can identify a blockage at the tool. At box 431, the controller 212 checks whether there is a blockage at the tool area which could cause the blockage identified at the meter 204, 302. More specifically, if commodity is not properly leaving the tool 28, the blockage of commodity could fill the corresponding passages 54 and cause the blockage identified in box 430.

When the controller 212 identifies a blockage at the tool in box 431, the controller 212 may allow any tool blockage systems to address or warn of the blockage at the tool and return to box 402 to monitor the meter assembly. However, if the controller 212 does not identify a blockage at the tool in box 431, the controller may identify that the blockage at the meter assembly is not caused by a backup from a blockage at the tool. According, the controller 212 may execute box 432 when there is not commodity blockage at the tool in box 431.

In box 432, the controller may utilize the user interface 228 to identify the under meter blockage. More specifically, the controller 212 may utilize a display screen to show an icon illustrating the blockage or providing a textual warning about the blockage at the meter. Further still, any other visual or auditory signal may be expressed via the controller 212 to identify the blockage of box 430. In yet another example, the controller 212 may utilize haptic feedback to identify the blockage. Further still, in one aspect of box 430 the controller 212 may send an indication of the blockage to a remote device such as a computer, smartphone, tablet, or the like. Accordingly, the controller 212 may utilize many different indicators or combination of indicators to identify the blockage in box 430.

After box 432, the controller 212 may continue to execute the logic 400 discussed herein. Further, the controller 212 may substantially continuously monitor and execute the boxes discussed herein for the logic 400. In one non-exclusive example, the controller 212 may repeatedly execute the logic boxes at a rate appropriate to timely identify a blockage of commodity when present.

In one aspect of this disclosure, having two sensors allows the controller 212 to identify whether the meter is both being supplied commodity and passing the commodity to the corresponding passage 206, 208 properly. More specifically, the first sensor of box 404 must identify the presence of commodity at the inlet of the meter to ensure the roller is moving commodity there through. Then, the second sensor of box 430 must not identify a blockage of commodity to thereby ensure that commodity is both flowing into the meter and being effectively delivered to the corresponding passage 206, 208.

In one embodiment of this disclosure there may not be a box 404 and related at all. In this embodiment, the controller 212 may transition from box 402 directly to box 422. Further, the controller 212 may primarily monitor the second sensor in box 430 to ensure there is not a blockage of commodity at the outlet of the meter. In one aspect of this embodiment, the controller 212 may rely on one or more of the tank fill height sensor 214 and the tank load sensor 216 to identify whether commodity is in the tank 202. If commodity is in the tank 202, the controller 212 may assume commodity is present at the inlet of the meter and only monitor the outlet with the second sensor of box 430 to identify a blockage.

Figure 4C:
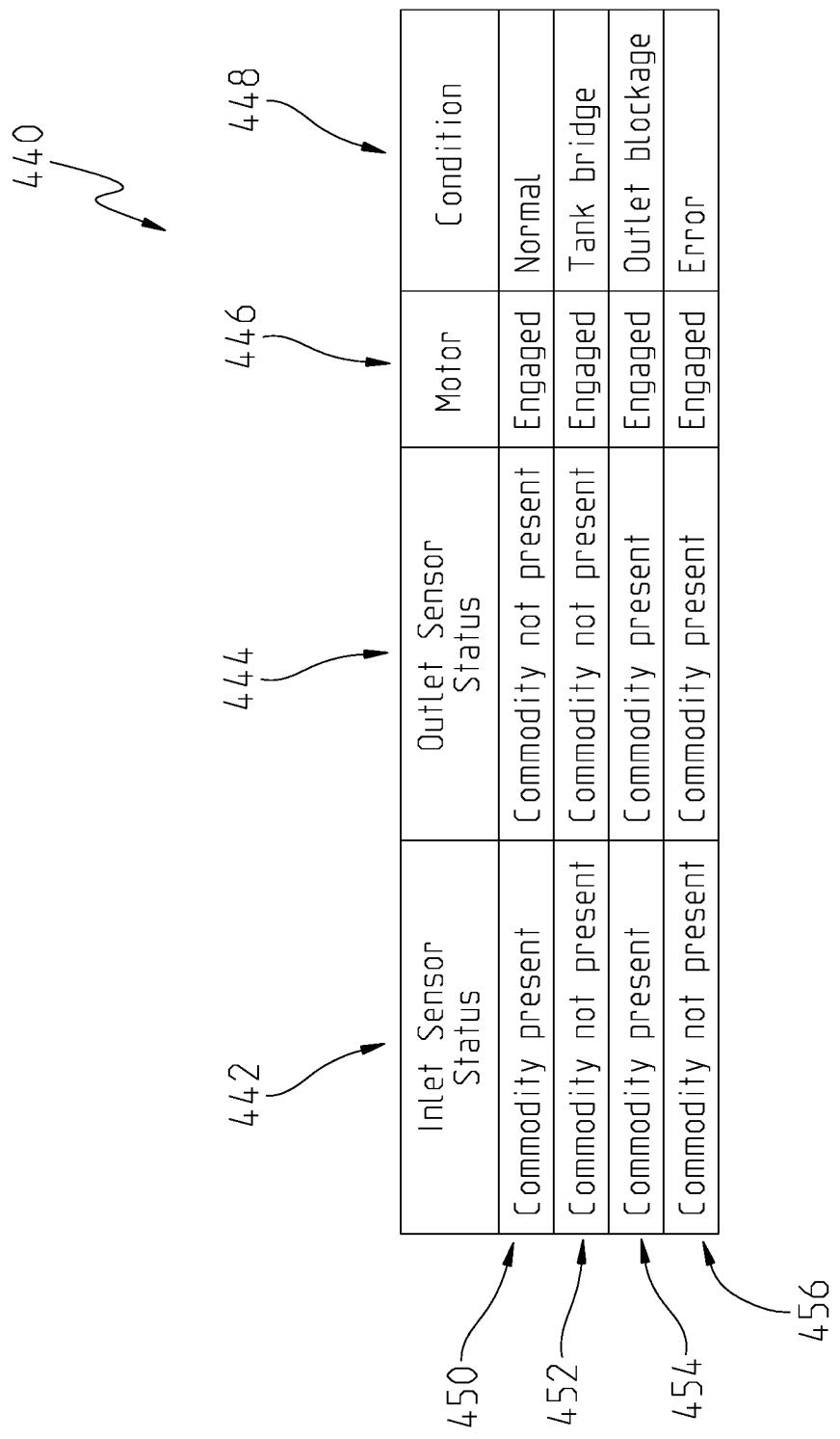
FIG. 4*c* is a logic chart for one embodiment of this disclosure.

Referring now to FIG. 4c, a logic chart 440 is illustrated. The logic chart 440 may be stored in the memory unit of the controller 212 and referenced by the controller 212 to implement the logic 400. More specifically, the potential sensor readings are identified in the first and second columns 442, 444 and the roller motor engagement and identified condition are listed in the third and fourth columns 446, 448. A first row 450 may indicate a normal scenario wherein the meter assembly is processing commodity as expected. More specifically, in the first row commodity is identified by the inlet sensor in column 442. Further, the outlet sensor may indicate a clear condition wherein no blockage of commodity is present in the second column 244. In this scenario, when the motor is engaged the meter assembly may be assumed to be functioning as intended.

A second row 452 may illustrate a tank bridge condition in column 448. The tank bridge condition may be identified when both the inlet sensor and the outlet sensor do not detect commodity and the roller motor is engaged. In this scenario, the controller 212 may further check one or more of the tank height and load sensors 214, 216 to confirm that commodity is present in the tank 202 as discussed herein. If commodity is in the tank but not identified by either the inlet sensor or the outlet sensor, the controller 212 may conclude that there is a tank bridge and respond accordingly.

In row 454, a meter outlet blockage may be the identified condition in column 448. The meter outlet blockage condition may be identified when both the inlet sensor and the outlet sensor identify the presence of commodity. As discussed herein, under proper operating conditions commodity should flow out of the outlet 222 and into one or more of the passages 206, 208. Accordingly, when the outlet sensor identifies commodity as in row 454 an outlet blockage condition may be present.

Lastly, in row 456 an error condition may be identified in column 448. The error condition may be determined when the inlet sensor is not identifying commodity but the outlet sensor is. Under normal operating conditions, this scenario should not occur and the controller 212 may indicate an error when the sensors indicate the readings of row 456.

Figure 5A:
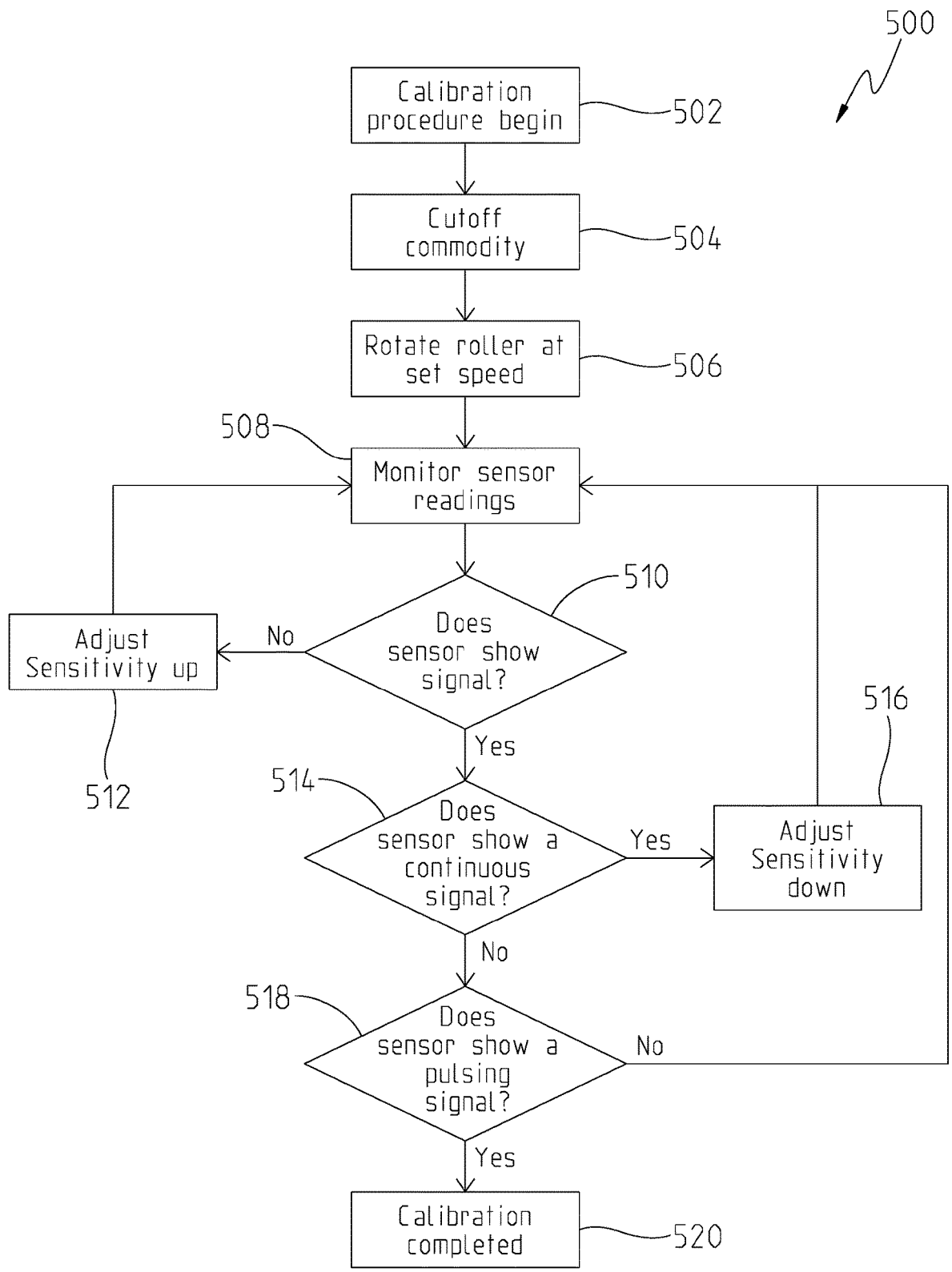
FIG. 5*a* is a logic flowchart for a calibration process.

Referring now to FIG. 5a, one non-exclusive example of a calibration process 500 is disclosed for the embodiment illustrated in FIG. 3. The calibration process 500 may begin in box 502 automatically if a calibration is needed or via an input from the user interface 228 or the like requesting the calibration process 500.

In one non-exclusive example, the controller 212 may utilize the table 501 of FIG. 5b to determine when to begin the calibration process 500. The table 501 illustrates the expected response of the sensors 304, 306 when commodity is not in the tank 202 (see column 503) and the roller 218 is engaged by the motor (see column 505). The first row 507 may represent the expected sensor readings when the sensors 304, 306 are properly calibrated. More specifically, both sensors 304, 306 may be showing a pulsing signal as the empty cavities 604 pass thereby. However, if either of the sensors are solid on or off while the tank 202 is empty and the motor is engaged (see rows 509, 511, 513, and 515), the controller 212 may identify that the sensors 304, 306 are miscalibrated (see column 517) and begin the calibration process of box 502.

Referring back to FIG. 5a, once the calibration process 500 begins in box 502 any commodity may be removed from the tank 202 in box 504 if the tank 202 is not already empty. In one aspect of this disclosure, the controller 212 may automatically execute the calibration process 500 when the tank 202 is identified as empty with one or more of the tank fill height sensor 214 or the tank load sensor 216. Regardless, in box 504 any commodity in the tank 202 is either removed or otherwise cutoff from the roller 218.

Once the commodity is removed or isolated from the roller 218, the controller 212 may operate the roller at a set speed in box 506. The set speed may be any speed that allows the controller 212 to execute the remaining boxes of the calibration process 500. Accordingly many different speeds may be appropriate for the roller 218 in box 506. In box 508, the controller 212 may monitor the sensor 304, 306 readings. As the controller 212 monitors the sensor readings, the controller 212 may determine whether the sensor 304, 306 is identifying any signal to the controller 212 in box 510. If the sensor 304, 306 is not identifying any signals in box 510, the controller 212 may increase the sensitivity in box 512 of the sensor 304, 306 that is not identifying a signal and re-executed box 508 and box 510.

If the controller 212 does identify a signal from the sensors 304, 306 in box 510, the controller 212 may check if the signal is continuous in box 514. If the signal of the sensor 304, 306 is continuous in box 514, the controller 212 may reduce the sensitivity of the corresponding sensor 304, 306 in box 516. After the sensitivity of the sensor is reduced in box 516, the controller 212 may re-execute boxes 508, 510, and 514 until the signal of the sensor 304, 306 is no longer continuous in box 514.

When the sensitivity of the sensors 304, 306 is adjusted as discussed with reference to the previous boxes, the controller 212 may check that the sensor's 304, 306 signal is pulsing in box 518. More specifically, in one aspect of the embodiment of FIG. 3, the sensors 304, 306 may be positioned along the roller 218 to determine whether commodity is in the cavities 604 of the roller 218. When no commodity is being supplied to the inlet 220 and the roller 218 is rotating, the sensors' 304, 306 signal should be pulsing as the cavities 604 of the roller 218 pass thereby. Accordingly, if the controller 212 identifies pulsing signals in box 518 it may determine that the calibration process is complete and execute box 520. However, if the controller 212 does not identify pulsing signals in box 518, the controller 212 may return to box 508 and modify the sensors 304, 306 accordingly.

The controller 212 may implement the calibration process 500 to simultaneously calibrate both sensors 304, 306 or may calibrate only one of the sensors 304, 306 at a time utilizing the teachings discussed herein. Accordingly, while this disclosure describes both sensor 304, 306 at the same time with reference to the calibration process 500, the calibration process may also be implemented for only one of the sensors 304, 306 at a time.

Further, the adjusting the sensitivity boxes 512, 516 may adjust the sensitivity using any adjustment increment reasonable for the sensor 304, 306. More specifically, the controller 212 may continue to monitor the sensors 304, 306 as it incrementally adjust the sensitivity of the sensor 304, 306 until the desired conditions are met (i.e. a signal is identified in box 510 and the signal is not continuous in box 514). The incremental adjustment value may be preset and communicated to, or stored in, the controller 212 or it may be a user-selectable option via the user interface 228.

FIG. 5c illustrates one exemplary embodiment of a lookup table that may be referenced by the controller 212 as part of the logic implemented with the embodiment of FIG. 3. More specifically, the lookup table of FIG. 5c may have a first column 519 identifying the reading from the inlet sensor 304, a second column 521 identifying the reading of the outlet sensor 306, a third column 523 identifying the status of the motor powering the roller 218, a fourth column 525 identifying the status of the tank 202, a fifth column 527 identifying the condition of the meter assembly 300, and a sixth column 529 showing a response. Further, each row 531, 533, 535, 537, 539, 541, 543 may represent an exemplary scenario that may be present in the meter assembly. In the lookup table of FIG. 5c, it is assumed the sensors 304, 306 are properly calibrated as discussed herein.

Referring to row 531, a typical scenario is shown. In row 531, commodity is passing through the meter assembly 300 and therefore causes the inlet sensor 304 to give a solid reading in column 519, indicating commodity is passing thereby. Similarly, the outlet sensor 306 is pulsing as the empty cavities of the roller 218 pass thereby in column 521. The pulsing value of the outlet sensor 306 indicates that commodity is properly leaving the roller 218 and entering one or more of the passages 206, 208. The controller 212 may ensure the motor is engaged to rotate the roller 218 in column 523 and check one or more of the tank fill height sensor 214 and tank load sensor 216 to determine the status of the tank 202 in column 525. In the scenario of row 531, the condition of column 527 may be normal and the response of column 529 may be a green roller icon on the user interface 228 indicating the meter assembly 300 is functioning as expected.

Referring now to row 533 a scenario with a roller 218 rotation error is illustrated. In this scenario, the inlet sensor 304 may show commodity in the roller 218 in column 519. More specifically, in the scenario of row 522 commodity may remain in the cavities of the roller even if the roller 218 is not rotating. However, in column 521 the outlet roller 218 may be showing an off or otherwise not pulsing condition since the roller 218 is not rotating thereby. The controller 212 may check that the motor is engaged in column 523 and that the tank is not empty in column 525. In this scenario, the condition of column 527 may be a roller failure since the roller 218 is not rotating as expected. Accordingly, the response of column 529 may be a red roller icon illustrated on the user interface 228 to indicate the condition.

Row 535 may illustrate a scenario having a blockage of commodity in or below the outlet 222 of the meter assembly 300. In this scenario, both the inlet sensor 304 and the outlet sensor 306 may indicate a solid on condition in columns 519 and 521. In this scenario, commodity remains in the cavities of the roller 218 as it rotates due to the blockage at or below the outlet 222. Accordingly, both the inlet sensor 304 and the outlet sensor 306 identify commodity in the roller 218 which is indicative of a blockage at or below the outlet 222 as identified in the condition column 527. In this scenario the response of column 529 may be a red roller icon illustrated on the user interface 228 to indicate the condition.

Referring now to row 537, a scenario having an above-meter commodity bridge is illustrated. More specifically, both the inlet sensor 304 and the outlet sensor 306 may be pulsing in columns 519 and 521. The pulsing sensor readings indicates that commodity is not present in the roller 218 as it rotates. In this scenario, the controller 212 may ensure that the tank 202 is not empty in column 525 by checking one or more of the tank fill height sensor 214 and the tank load sensor 216. If the tank 202 is not empty but the roller 218 is not processing commodity, the controller 212 identifies the condition of column 527 to be an above-meter bridge or blockage of commodity. That is to say, the controller 212 identifies commodity is present in the tank 202 but not entering the inlet 220. In this scenario, the response of column 529 may include altering the parameters of the agitator 210 as explained with reference to FIG. 4b for example. Additionally, or instead of altering the parameters of the agitator 210, the controller 212 may identify the condition on the user interface 228 to allow the user to manually dislodge the bridge.

In the scenarios of rows 539 and 541, the motor powering the roller 218 may be off and therefore the roller 218 may not be rotating. However, in this scenario one of the inlet sensor 304 or outlet sensor 306 may be providing an intermittent reading. This may be indicative of a roller blow-by condition of the roller in column 527. A roller blow-by condition may occur when flutes of the roller do not extend entirely to the meter housing and a gap is defined between the end of the roller flute and the adjacent roller housing. In this configuration, a roller blow-by may occur when some commodity flows past the roller even when the roller is not rotating. Accordingly, the response of column 529 may be to display an orange icon of a roller on the user interface 228 indicating the roller blow-by condition.

The scenario of row 543 may be when the tank 202 is empty. In this scenario, both the inlet sensor 304 and the outlet sensor 306 may be showing a pulsing signal in columns 519 and 521. The pulsing signal is indicative of the roller 218 rotating without processing any commodity there through. The controller 212 may utilize one or more of the tank fill height sensor 214 and the tank load sensor 216 to ensure the tank 202 is empty and that an above-meter bridge of row 537 is not occurring. If the tank 202 is identified as empty, the controller 212 may indicate a tank warning or the like utilizing the user interface 228 as part of the response from column 529.

The responses discussed herein with reference to column 529 are only some examples of potential responses and other responses are also considered. More specifically, while displaying icons on the user interface 228 is discussed herein, other responses may include sending auditory indications such as beeps or the like. Further still, haptic feedback may communicate the condition to the user as part of the response. In yet another embodiment, a simple warning light or the like may illuminate as part of the response. Accordingly, any response that can communicate the condition is considered herein and the specific responses discussed are meant as non-exclusive examples.

Figure 6:
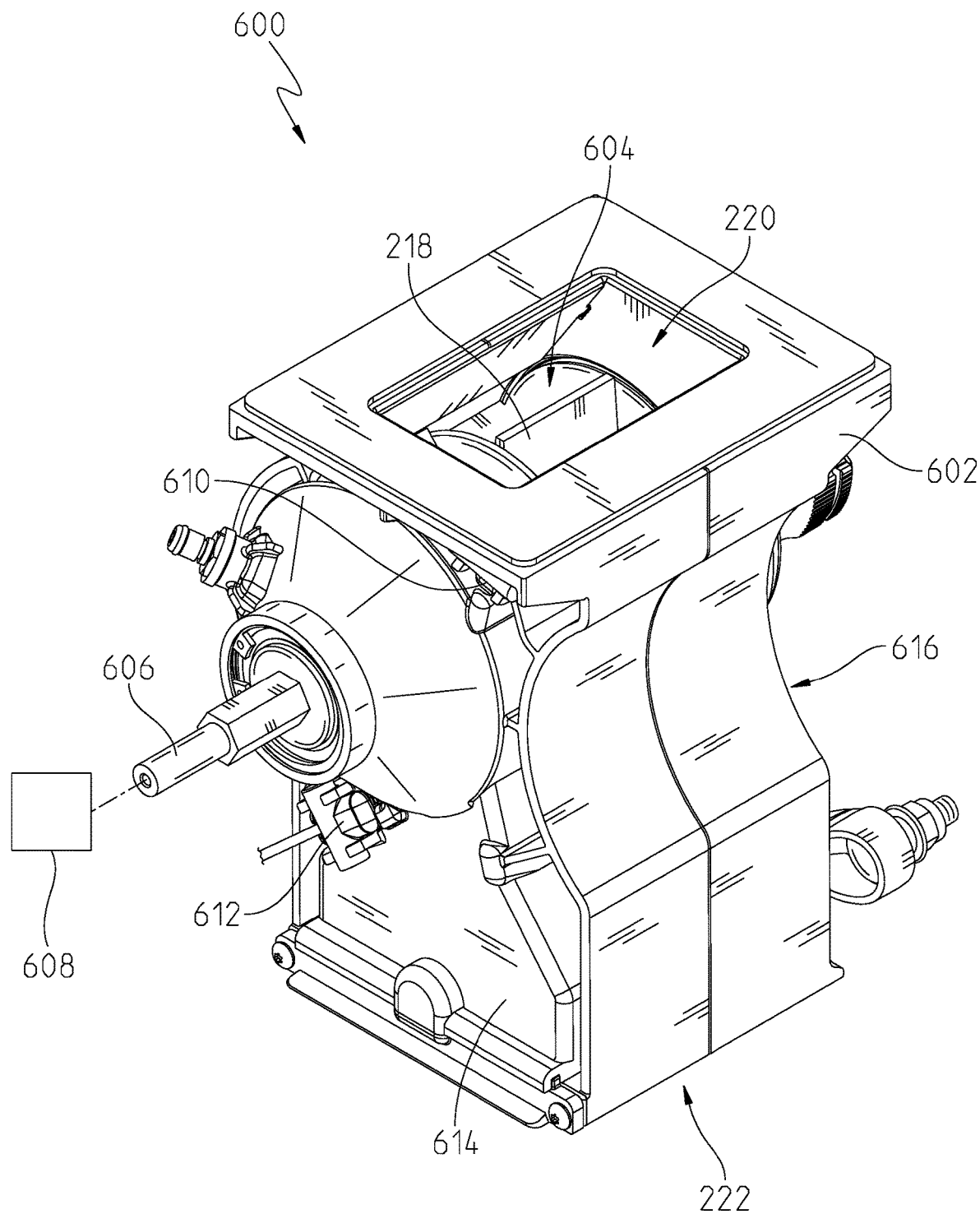
FIG. 6 is an elevated perspective view of a meter assembly.

Referring now to FIG. 6, one embodiment of a meter assembly 600 is illustrated separated from the tank 202, passages 206, 208, and other portions of the seeder 20. The meter assembly 600 may have an inlet 220, an outlet 222, and a roller 218 positioned there between as discussed herein. The cavities 604 of the roller 218 discussed herein may be more apparent with reference to FIG. 6. The meter assembly 600 may generally be formed of a meter housing 602. The meter housing 602 may be a molded material, such as plastic, and formed from two separate sections coupled to one another. The meter housing 602 may provide a passageway for commodity between the inlet 220 and the outlet 222 that is metered by the rotation of the roller 218.

The roller 218 may have a roller shaft 606 that extends through an orifice of the meter housing 602 and is coupled to a roller motor 608. The roller motor 608 may be an electrical, hydraulic, or pneumatic motor that selectively rotates the roller 218. As discussed herein, the rotation speed and direction of the roller 218 may be determined by the speed and direction with which the roller motor 608 rotates. Further, the controller 212 may selectively control the speed and direction of the roller motor 608.

The meter housing 602 may have a first cavity defined therein to receive an inlet sensor 610 and a second cavity defined therein to receive an outlet sensor 612. In one embodiment of this disclosure, the inlet sensor 610 may function in substantially the same manner as the inlet sensor 220 of FIG. 2. Similarly, the outlet sensor 612 may function in substantially the same manner as the outlet sensor 224 of FIG. 2. In one aspect of this disclosure, the first and second cavities are located to position the corresponding sensors 610, 612 in close proximity to commodity flowing through the meter assembly 600 without directly exposing the sensors 610, 612 to the commodity. In other words, at least a portion of the meter housing 602 may remain between the sensors 610, 612 and the commodity as it moves there through.

Figure 7:
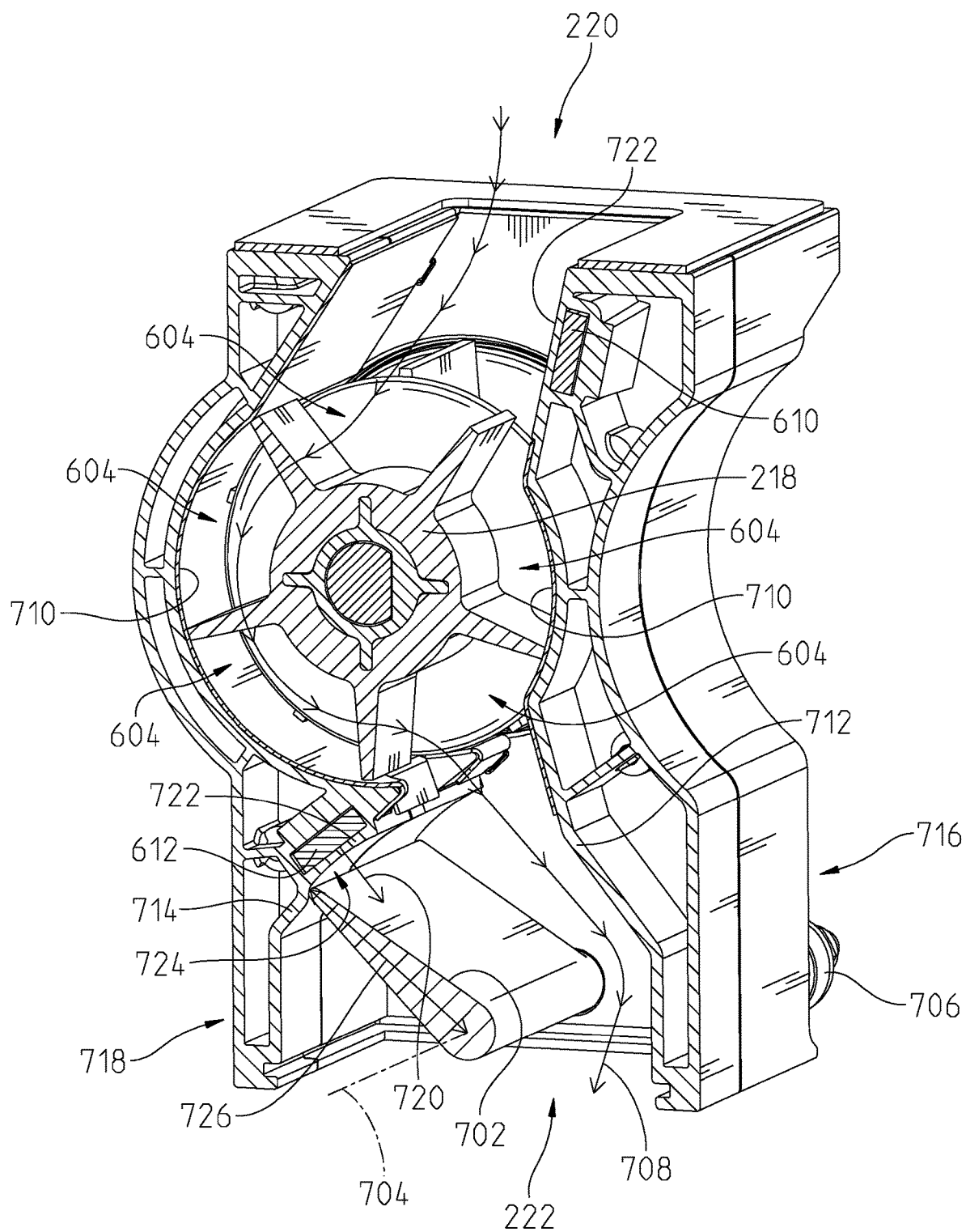
FIG. 7 is an elevated perspective section view of the meter assembly of FIG. 6.
Figure 8A:
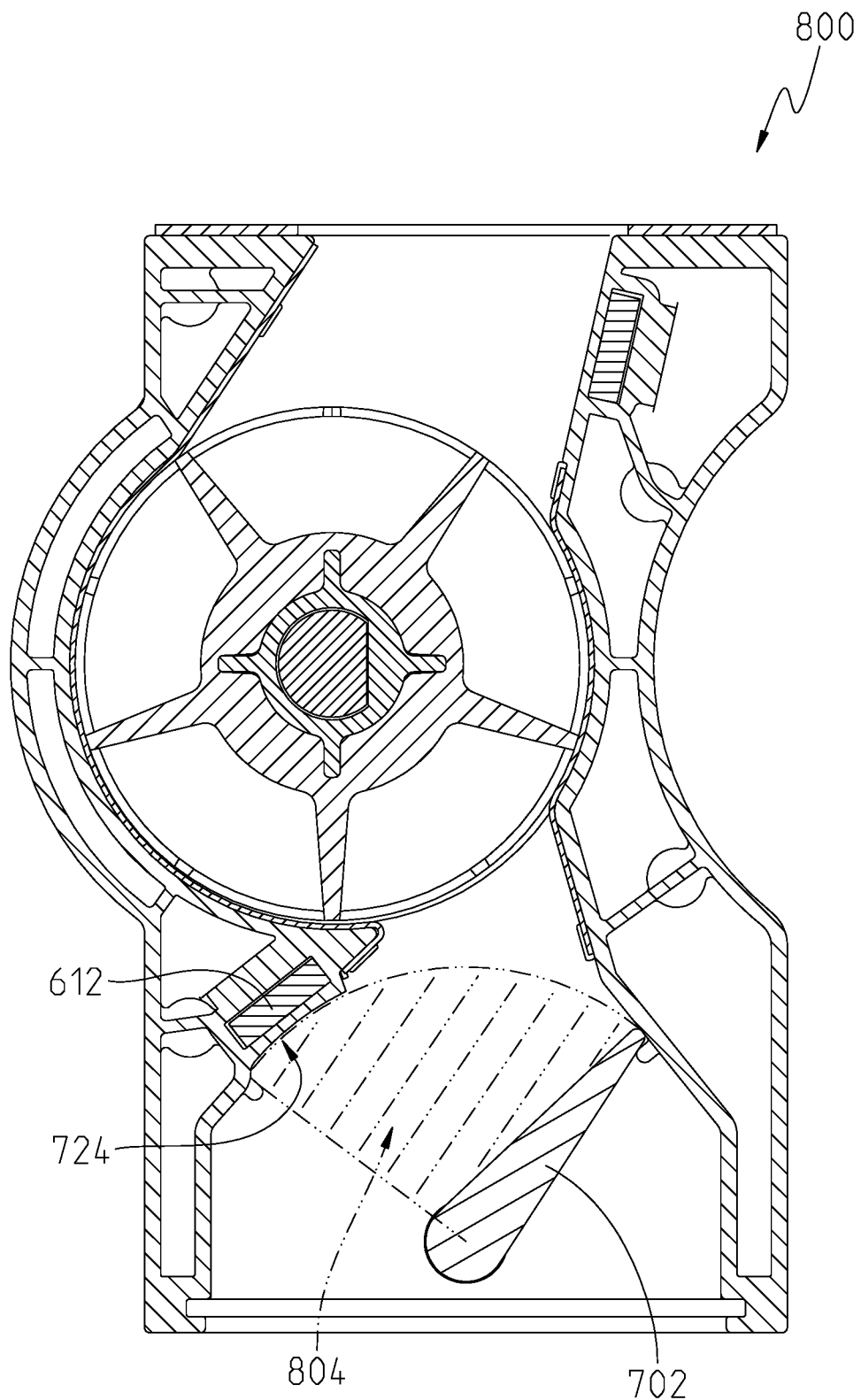
FIG. 8a is a side section view of the meter assembly of FIG. 6 in a first position.
Figure 8B:
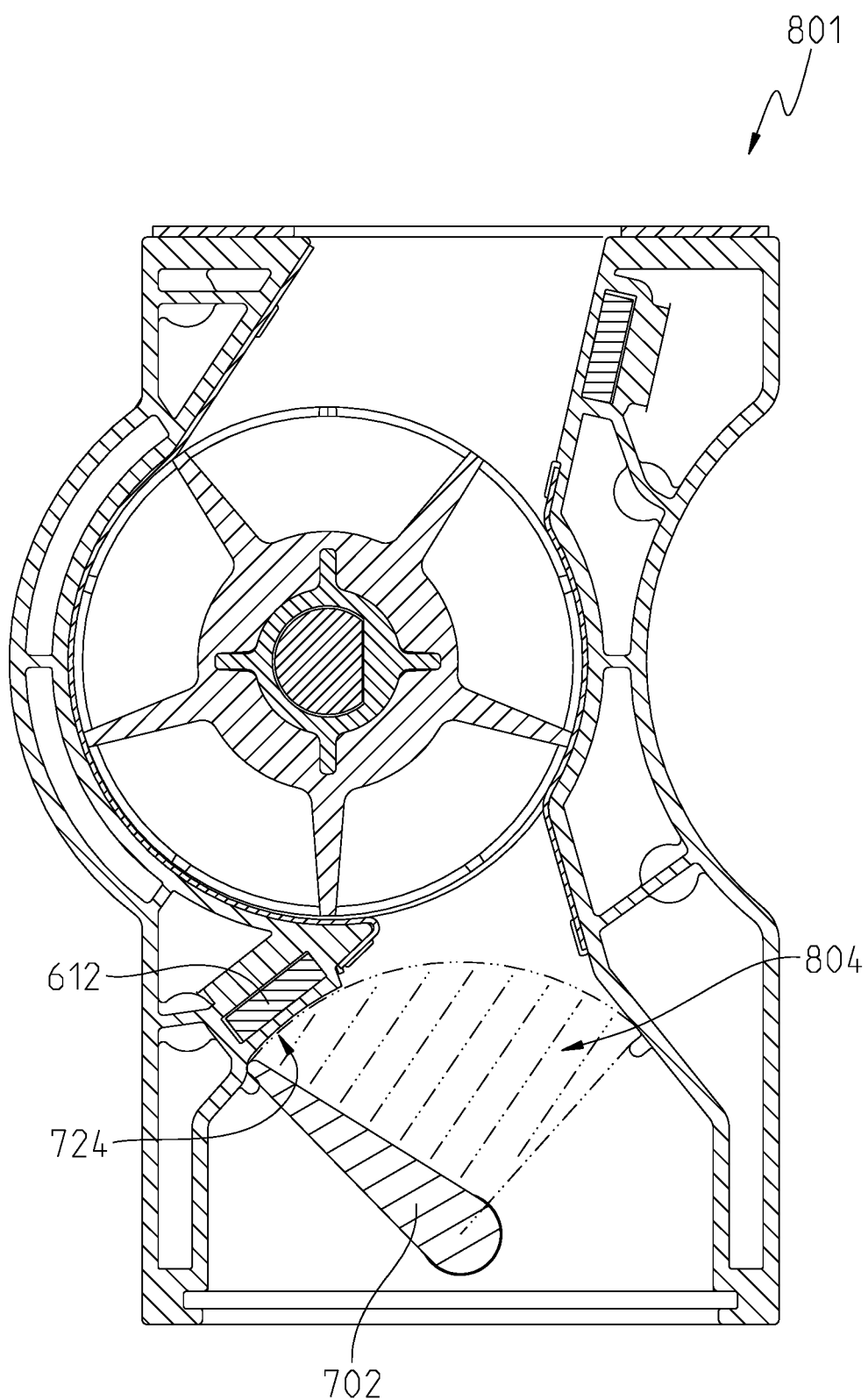
FIG. 8b is a side section view of the meter assembly of FIG. 6 in a second position.

Referring now to FIG. 7, a partial section view of the meter 600 is illustrated. More specifically, a flapper 702 is illustrated in FIG. 7. The flapper 702 is pivotally coupled to the meter housing 602, either directly or through a manifold coupled to the meter housing 602, to pivot about a flapper axis 704 between a first position 800 (see FIG. 8a) and a second position 801 (see FIG. 8b). The position of the flapper 702 may be selectively controlled by a flapper arm 706. More specifically, the flapper arm 706 may be coupled to an actuator or the like to selectively pivot the flapper between the first position 800 and the second position 801. Further, the controller 612 may selectively alter the actuator of the flapper arm 706 to thereby move the flapper between the first and second positioned 800, 801.

While a flapper 702 is illustrated coupled to the meter housing 602 as discussed herein, this disclosure considers positioning the flapper 702 in a manifold coupled to the meter housing as well. In this configuration, the flapper 702 and corresponding components may be positioned in the manifold which can be selectively coupled to the meter housing 602. Further still, this disclosure also considers utilizing a turret type run selector. The turret style run selector may be a rotary run selector that alters the flow path of commodity as it rotates about a rotation axis. Accordingly, this disclosure contemplates utilizing different types of run selectors either coupled directly to the meter housing 602 or to a manifold coupled thereto.

A commodity flow path 708 is also illustrated in FIG. 7. The commodity flow path 708 may generally represent the intended flow of commodity provided at the inlet 220 when the roller motor 608 is rotating the roller 218 in a counter-clockwise direction as viewed in FIG. 7. As discussed herein, the roller 218 has a plurality of cavities 604 that receive commodity at the inlet 220 and transfer the commodity to the outlet 222 as the roller 218 rotates.

In one aspect of this disclosure, wear plates 710 may be positioned between the roller 218 and the meter housing 602 along the radially outer portions of the roller 218. More specifically, as the roller 218 rotates, commodity positioned in the cavities 604 may experience forces radially away from the rotation axis of the roller 218. The wear plates 710 may be formed of a material that is less likely to wear due to this contact compared to the material of the meter housing 602. In one non-exclusive example, the wear plates 710 may be formed of a metallic material while the meter housing 602 is formed of a plastic or the like. However, many different materials for the wear plates 710 and meter housing are also considered herein.

As illustrated in FIG. 7, the meter assembly 600 may define the commodity flow path 708 generally between a first wall 712 and a second wall 714 defined by the meter housing 602. The first wall 712 may be the portion of the meter housing 602 exposed to commodity on a first side 716 of the meter assembly 600 while the second wall 714 may be the portion of the meter housing 602 exposed to commodity on a second side 718 of the meter assembly 600. In one aspect of this disclosure, the commodity flow path 708 may be defined such that as commodity exits the cavities 604 of the roller 218, the commodity is generally directed towards the outlet 222 and the first wall 712. That is to say, as commodity exits the cavities 604 of the roller 218, the commodity is generally travelling at least partially away from the second wall 714.

In one aspect of this disclosure, the outlet sensor 612 is positioned along the second wall 714 to ensure a surplus commodity is only identified during a clogged condition. More specifically, the outlet sensor 612 may be positioned to have a primary reading direction 720 that is oriented to a portion of the outlet 222 that is not substantially exposed to the commodity flow path 708. In this configuration, the outlet sensor 612 will not falsely identify a blocked condition under high flow conditions because the commodity flow path 708 is generally directed away from the primary reading direction 720 of the outlet sensor 612. In other words, the outlet sensor 612 is not positioned in the first wall 712 because the commodity flow path 708 is directed toward the first wall 712 out of the roller 218 and positioning the outlet sensor 612 there along could cause false blockage readings during high commodity flow. However, in other embodiments the outlet sensor 612 is positioned along the first wall 712 instead of the second wall 714.

In another aspect of this disclosure, the outlet sensor 612 may be positioned along a portion of the second wall 714 so the primary reading direction 720 is not covered by one of the wear plates 710. As discussed herein, the wear plates 710 may be formed of a more wear resistant material compared to the meter housing 602. Accordingly, by positioning the outlet sensor 612 so the primary reading direction 720 is not through the wear plate 710, the resolution with which the outlet sensor 612 can identify commodity is increased.

Similarly, the inlet sensor 610 may be positioned along a portion of the inlet 220 that is not covered by the wear plate 710.

In another aspect of this disclosure the inlet and outlet sensors 610, 612 may be separated from the commodity flow path 708 by meter material 722. In this orientation, the sensor 610, 612 may identify the presence of commodity in the commodity flow path 708 through the meter material 722 to thereby protect the sensors 610, 612 from direct contact with the commodity. That is to say, the sensors 610, 612 may be substantially protected from damage caused by the commodity because the meter material 722 separates the sensors 610, 612 from the commodity.

In another aspect of this disclosure, the meter material 722 separating the outlet sensor 612 from the commodity flow path 708 may have an arc-shaped surface 724 facing the commodity flow path 708. More specifically, the arc-shaped surface 724 may be defined about an arc that is coaxial with the flapper axis 704. Further still, the arc-shaped surface 724 may be spaced from the flapper axis 704 a distance that is about the same as a flapper length 726. In this configuration, as the flapper 702 transitions between the first position 800 and the second position 801, a distal end of the flapper 702 passes along the arc-shaped surface 724. Further still, in one aspect of this disclosure the distal end of the flapper 702 may pass close enough to the arc-shaped surface 724 to clean at least some residue or debris positioned thereon to thereby reduce obstructions in the primary reading direction 720 to increase clarity of the outlet sensor 612 readings.

While the outlet sensor 612 is illustrated and described as positioned adjacent to the arc-shaped surface 724, other embodiments considered herein position the outlet sensor adjacent to any portion of the meter housing 602 along a flapper sweep cavity 804. More specifically, the flapper sweep cavity 804 may be defined in the meter housing 602 to allow the flapper 702 to transition between the first position 800 and the second position 802. In one aspect of this disclosure, a first and second sidewall 614, 616 may be located along the sides of the flapper sweep cavity 804. In this configuration, the outlet sensor 612 may be positioned adjacent to the first or second sidewall 614, 616 along the flapper sweep cavity 804 to thereby identify the presence of a blockage of commodity in the outlet 222. Further, positioning the outlet sensor 612 in a sidewall 614, 616 may still allow the flapper 702 to at least partially clean any debris therefrom as the flapper 702 transitions between the first and second position 800, 801.

Figure 9:
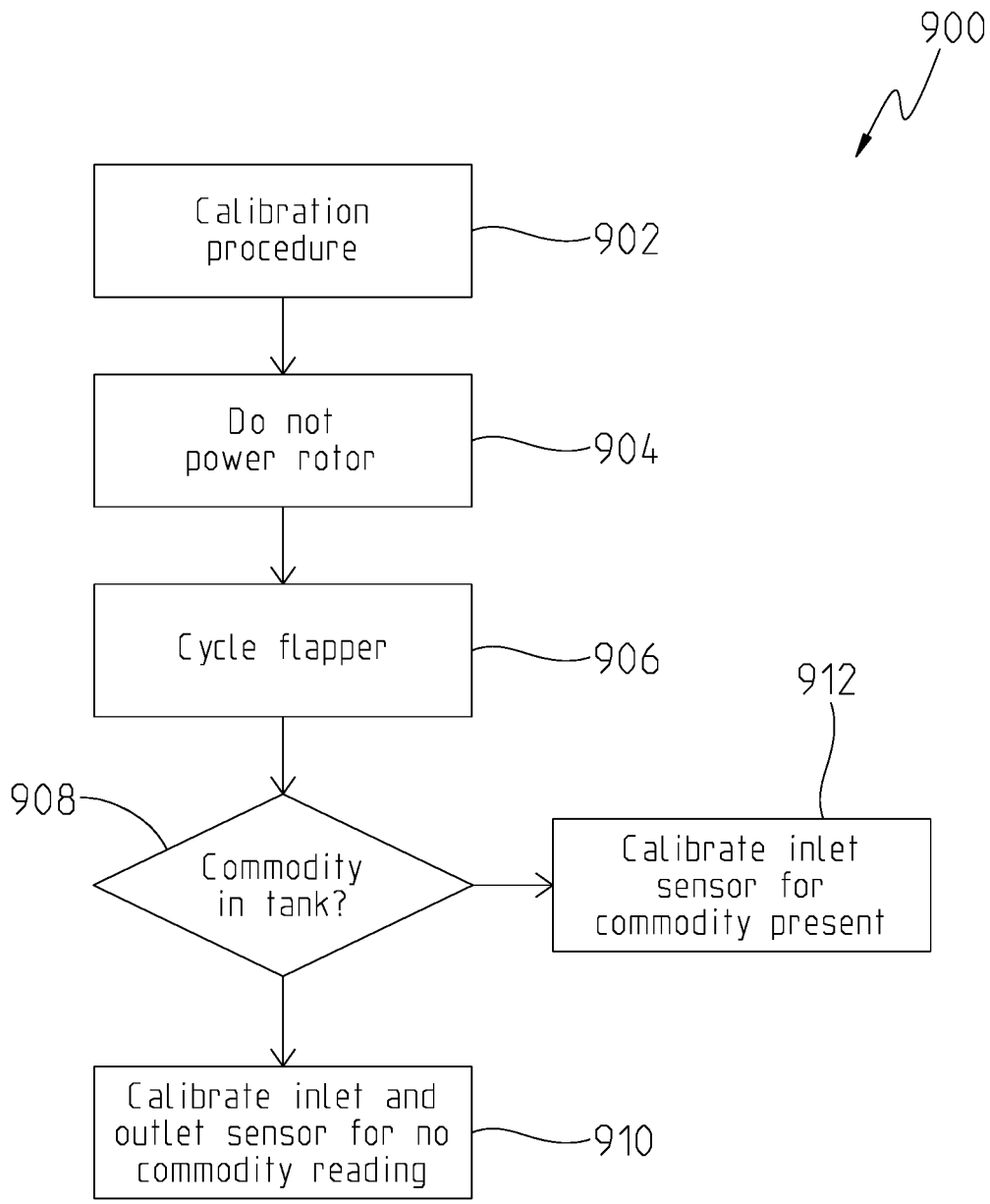
FIG. 9 is a logic flowchart for another embodiment of a calibration process.

Referring now to FIG. 9, another aspect of this disclosure includes a calibration process 900 for sensors 610, 612. The calibration process 900 may start with box 902 wherein the calibration process 900 is initiated as part of a routine calibration or because of a user-initiated calibration. The user-initiated calibration may be initiated by a selectable icon, button, switch, or the like on the user interface 228 or elsewhere that indicates the user intends to perform the calibration process 900. Alternatively, the calibration process 900 may automatically be executed by the controller 212 after a set amount of time between calibrations or automatically at the start of the tractor 22 or seeder 20. Further still, the calibration process 900 may be executed after a preset threshold of operating hours has passed. Further still, the calibration process 900 may be initiated if the outlet sensor 612 is giving faulty readings, indicating a potential debris buildup may be present. Accordingly, this disclosure contemplates initiating the calibration process 900 using many different methods.

Once the calibration process is initiated in box 902, in box 904 the controller 212 may ensure the roller 218 is not powered. The controller 212 may utilize any of the methods discussed herein to identify the state of the roller 218. In one aspect of this disclosure, the controller 212 may stop powering the roller 218 in box 904 to ensure any commodity in the tank 202 will be positioned along the inlet sensor 610 and not along the outlet sensor 612.

In box 906 the controller 212 may cycle the flapper 702 to wipe the arc-shaped surface 724 of any debris buildup that may be present. More specifically, cycling the flapper 702 in box 906 moves the flapper 702 over the arc-shaped surface 724 of the meter assembly 600 in order to remove any residual material buildup that may affect the outlet sensor 612 reading.

In box 908 the controller 212 may also check whether there is commodity in the tank 202. More specifically, one or more of the tank fill height sensor 214 and the tank load sensor 216 may be monitored in box 908 to ensure at least some commodity is in the tank 202. If commodity is not in the tank in box 908, the calibration process 900 may execute box 910 wherein both the inlet sensor 610 and the outlet sensor 612 are calibrated to a no-commodity reading. However, if commodity is in the tank 202 in box 908, the controller 212 may execute box 912 wherein the inlet sensor 610 is calibrated to a commodity present reading and the outlet sensor 612 is calibrated to a no-commodity reading.

The calibration process 900 may also be implemented when a different type of commodity is being processed through the meter. For example, when the commodity is a seed it may have a different density than when the commodity is a fertilizer. Further still, different types of seed and fertilizer may have different sensible properties relative to others. Accordingly, when the type of commodity is altered in the tank 202 the calibration process 900 may be executed to ensure the controller 212 can properly identify the presence of commodity in the meter assembly 600. Further still, in one aspect of this disclosure the user interface 228 may provide user selectable commodity types to be considered during the calibration process 900. More specifically, the controller 212 may compare the sensor readings to the expected sensor readings for the type of commodity and identify an error if the sensor reading values are not within an expected range for the commodity.

While a calibration process 900 is discussed herein, this disclosure also contemplates utilizing sensors and the like that do not require a calibration process at all. More specifically, in one aspect of this disclosure the sensors 610, 612 may be able to identify the presence of commodity in the meter assembly 600 without requiring a calibration process. Further still, in other embodiments the type of commodity being processed by the meter may be input to the controller 212 via the user interface 228 or the like and the sensors 610, 612 may automatically be adjusted to calibrations associated with the particular type of commodity being processed. In this embodiment, the calibrations associated with the particular type of commodity may be predetermined and stored in a memory unit that the controller 212 accesses to implement the selected commodity calibration.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method for identifying commodity flow through a meter on an agricultural machine that has a meter housing coupled to a tank and a first sensor in communication with a controller, the first sensor coupled to the meter housing, comprising:

identifying, with the controller through the first sensor, when a buildup of commodity is positioned adjacent to the first sensor positioned on an outlet of the meter housing, the outlet of the meter housing being at or between a roller of the meter housing and one or more passage configured to direct commodity to a secondary distribution tower;

initiating a first response, with the controller, when the buildup of commodity is identified adjacent to the first sensor indicating commodity is not transitioning from the meter housing to the secondary distribution tower;

identifying, with the controller through a second sensor positioned at an inlet of the meter housing, when commodity is provided past the inlet, the inlet being at or between the roller and the tank; and initiating a second response with the controller when the second sensor does not identify the presence of commodity;

wherein the second response includes initiating an agitation step, with the controller, to agitate any commodity in the tank.

2. The method of claim 1, further comprising identifying the presence of commodity in the tank with a third sensor, wherein the second response includes identifying the presence of commodity in the tank with the controller through the third sensor.

3. The method of claim 1, further comprising identifying the presence of commodity in the tank with a third sensor, wherein the second response includes determining the presence of commodity in the tank with the controller through the third sensor and initiating the agitation step, with the controller, when the third sensor identifies the presence of commodity.

4. The method of claim 1, further wherein the first response includes providing an alert that the buildup of commodity was identified.

5. The method of claim 1, wherein the first sensor is positioned along an exhausted side of the roller.

6. The method of claim 5, further comprising identifying when commodity is passing through a processing side of the roller with the second sensor.

7. A method for identifying commodity flow through a meter on an agricultural machine that has a meter housing coupled to a tank and a first sensor in communication with a controller, the first sensor positioned at the outlet of a roller of the meter housing, comprising:

identifying, with the controller through the first sensor, when a buildup of commodity is positioned adjacent to the first sensor along the outlet of the roller, wherein the buildup of commodity indicates that commodity is not transitioning from the meter housing to a secondary distribution tower;

initiating a first response, with the controller, when the buildup of commodity is identified adjacent to the first sensor; and initiating a second response with the controller when a second sensor positioned at an inlet of the roller of the meter housing does not identify the presence of commodity, the second response including any one or more of:

initiating an agitation step, with the controller, to agitate any commodity in the tank;

determining the presence of commodity in the tank with the controller through a third sensor; and providing an alert that commodity is not passing through the meter housing.

8. The method of claim 1, further comprising monitoring, with the controller, one or more of a motor speed and a motor torque of a meter roller motor and identifying with the controller, when the meter roller motor is not rotating.

9. The method of claim 8, further comprising executing a calibration procedure for the first sensor, with the controller, when the meter roller motor is not rotating to establish a no-commodity reading.

10. The method of claim 9, further comprising selectively moving a run selector positioned to selectively pass proximate to the first sensor, with the controller, to pass the first sensor as part of the calibration procedure.

11. The method of claim 1, further comprising:

communicating a selected commodity type from a selection of commodity types to the controller; and executing a calibration operation for the first sensor, with the controller, based on the selected commodity type.

12. A method for identifying a blockage of commodity in a meter assembly that has a tank, a meter housing having a roller rotationally coupled therein to selectively distribute a commodity from an inlet of the meter housing to an outlet of the meter housing, a first sensor coupled to the meter housing at the outlet, a second sensor coupled to the meter housing at the inlet, and a controller, comprising:

providing a commodity blockage reading to the controller when the first sensor identifies that commodity is not exiting the outlet and transitioning from the meter housing to a secondary distribution tower and the second sensor identifies commodity is not entering the inlet;

identifying the commodity blockage reading with the controller and providing a blockage response;

wherein, the blockage response comprises agitating any commodity in the tank.

13. The method of claim 12, further comprising:

determining, with the controller through a third sensor, when commodity is in the tank; and altering parameters of an agitator with the controller when the second sensor does not identify commodity and the third sensor identifies there is commodity in the tank.

14. The method of claim 12, further wherein the first sensor identifies when cavities of the roller pass thereby and selectively executes a calibration process for the first sensor, the calibration process comprising:

maintaining a rotation speed of the roller with the controller;

increasing the sensitivity of the first sensor with the controller when the first sensor is not communicating a signal to the controller; and decreasing the sensitivity of the first sensor with the controller when the first sensor is communicating a constant signal to the controller.

15. The method of claim 12, further comprising selectively executing a calibration process for the first sensor, the calibration process comprising:

placing the roller in a no-rotation state with the controller;

moving a run selector from a first position to a second position with the controller to thereby wipe debris from a run selector cavity; and setting a no commodity reading value for the first sensor with the controller.

16. A method for identifying the blockage location of a meter assembly, the meter assembly having a meter housing having a roller and an inlet and an outlet, an inlet sensor, an outlet sensor, and a controller, the inlet sensor positioned at a location of the meter housing that identifies when commodity is provided through the inlet from a tank to the roller, the outlet sensor at a location of the meter housing that identifies when commodity is not exiting the outlet from the roller and transitioning from the meter housing to a secondary distribution tower, comprising:

monitoring the inlet sensor and outlet sensor with the controller to identify when commodity is not flowing through the meter assembly to the secondary distribution tower; and agitating any commodity in the tank when the controller identifies with the inlet sensor that commodity is not flowing through the meter assembly.

17. The method of claim 16, further comprising:

identifying, with the inlet sensor communicating with the controller, when commodity is not entering the inlet and providing an indication thereof, and identifying, with the outlet sensor communicating with the controller, when commodity is not substantially exiting the outlet and providing an indication thereof.

* * * * *